US010669941B2

(12) United States Patent
Fujii et al.

(10) Patent No.: US 10,669,941 B2
(45) Date of Patent: Jun. 2, 2020

(54) GAS TURBINE COOLING SYSTEM, GAS TURBINE FACILITY INCLUDING THE SAME, AND CONTROL DEVICE AND CONTROL METHOD OF GAS TURBINE COOLING SYSTEM

(71) Applicant: Mitsubishi Hitachi Power Systems, Ltd., Kanagawa (JP)

(72) Inventors: Satoko Fujii, Yokohama (JP); Tetsuya Yabe, Yokohama (JP); Kazuya Higashi, Yokohama (JP)

(73) Assignee: MITSUBISHI HITACHI POWER SYSTEMS, LTD., Kanagawa (JP)

( * ) Notice: Subject to any disclaimer, the term of this patent is extended or adjusted under 35 U.S.C. 154(b) by 192 days.

(21) Appl. No.: 15/777,767

(22) PCT Filed: Dec. 6, 2016

(86) PCT No.: PCT/JP2016/086176
§ 371 (c)(1),
(2) Date: May 21, 2018

(87) PCT Pub. No.: WO2017/110448
PCT Pub. Date: Jun. 29, 2017

(65) Prior Publication Data
US 2018/0372000 A1     Dec. 27, 2018

(30) Foreign Application Priority Data

Dec. 24, 2015  (JP) .................................. 2015-251222

(51) Int. Cl.
*F02C 7/18*   (2006.01)
*F02C 9/18*   (2006.01)
*F02C 9/00*   (2006.01)

(52) U.S. Cl.
CPC ................ *F02C 7/185* (2013.01); *F02C 9/00* (2013.01); *F02C 9/18* (2013.01); *F05D 2220/32* (2013.01);
(Continued)

(58) Field of Classification Search
CPC .... F02C 7/185; F02C 9/00; F02C 9/18; F05D 2270/305; F05D 2270/3062; F05D 2270/331; F05D 2270/335; F05D 2260/213
See application file for complete search history.

(56) References Cited

U.S. PATENT DOCUMENTS 5,782,076 A * 7/1998 Huber ........................ F02C 7/08
                                                                415/115
6,253,554 B1 * 7/2001 Kobayashi ................ F02C 7/12
                                                                60/736
(Continued)

FOREIGN PATENT DOCUMENTS

JP    58-043575    9/1983
JP    2000-161084  6/2000
(Continued)

OTHER PUBLICATIONS

International Search Report dated Feb. 21, 2017 in International (PCT) Application No. PCT/JP2016/086176.
(Continued)

*Primary Examiner* — Carlos A Rivera
(74) *Attorney, Agent, or Firm* — Wenderoth, Lind & Ponack, L.L.P.

(57) ABSTRACT

A gas turbine cooling system includes: a cooling air line that guides compressed air; a cooler that cools the compressed air; a flow rate adjuster that adjusts the flow rate of the cooling air; and a control device. The control device includes: a load change determination unit that determines whether a load indicated by a load command of the gas turbine has changed; a first command generation section that
(Continued)

generates a first command indicating such an operation amount of the flow rate adjuster as allows the flow rate of the cooling air to meet a target flow rate; and a second command generation section that, when it is determined that the load indicated by the load command has changed, generates a second command indicating such an operation amount of the flow rate adjuster as allows a change-adapted flow rate higher than the target flow rate to be met.

25 Claims, 9 Drawing Sheets

(52) U.S. Cl.
CPC .. *F05D 2260/213* (2013.01); *F05D 2270/303* (2013.01); *F05D 2270/3062* (2013.01); *F05D 2270/331* (2013.01); *F05D 2270/335* (2013.01)

(56) References Cited

U.S. PATENT DOCUMENTS

| | | |
|---|---|---|
| 2007/0110587 A1 | 5/2007 | Takeshita |
| 2010/0154434 A1* | 6/2010 | Kubota .................... F02C 7/18 |
| | | 60/785 |
| 2011/0138818 A1* | 6/2011 | Mizukami ............... F01D 11/24 |
| | | 60/778 |
| 2014/0083108 A1 | 3/2014 | Kunihiro |
| 2015/0252731 A1* | 9/2015 | Riordan .................... F02C 9/18 |
| | | 60/785 |
| 2016/0237910 A1 | 8/2016 | Saito et al. |
| 2017/0138201 A1* | 5/2017 | Takata ..................... F01D 5/081 |
| 2017/0167388 A1* | 6/2017 | Merry ..................... F01D 25/12 |
| 2017/0284307 A1* | 10/2017 | Inoue ...................... F01D 11/24 |
| 2019/0003394 A1* | 1/2019 | Fujii ...................... F01D 17/145 |

FOREIGN PATENT DOCUMENTS

| | | |
|---|---|---|
| JP | 2005-076461 | 3/2005 |
| JP | 2010-090817 | 4/2010 |
| JP | 2011-137470 | 7/2011 |
| JP | 2014-70510 | 4/2014 |
| JP | 2015-222023 | 12/2015 |
| WO | 2015/064428 | 5/2015 |

OTHER PUBLICATIONS

Written Opinion of the International Searching Authority dated Feb. 21, 2017 in International (PCT) Application No. PCT/JP2016/086176.

* cited by examiner

FIG. 7

GAS TURBINE COOLING SYSTEM, GAS TURBINE FACILITY INCLUDING THE SAME, AND CONTROL DEVICE AND CONTROL METHOD OF GAS TURBINE COOLING SYSTEM

TECHNICAL FIELD

The present invention relates to a gas turbine cooling system that cools hot parts coming in contact with combustion gas in a gas turbine, a gas turbine facility including this gas turbine cooling system, and a control device and a control method of a gas turbine cooling system.

The present application claims priority based on Japanese Patent Application No. 2015-251222 filed on Dec. 24, 2015, the contents of which are incorporated herein by reference.

BACKGROUND ART

A gas turbine includes an air compressor that generates compressed air by compressing outside air, a combustor that generates combustion gas by combusting fuel in the compressed air, and a turbine that is driven by the combustion gas. A combustion liner of the combustor, blades and vanes of the turbine, etc. are exposed to the high-temperature combustion gas. Thus, in the gas turbine, it is necessary to cool these hot parts so as to protect these hot parts from the heat of the combustion gas.

Patent Literature 1 below discloses a cooling system for cooling a combustion liner of a combustor that is one of hot parts of a gas turbine. This cooling system includes a cooling air line that guides compressed air compressed by an air compressor of the gas turbine to the combustion liner, a cooler that cools the compressed air in the cooling air line, and a booster that pressurizes the cooling air in the cooling air line.

CITATION LIST

Patent Literature

Patent Literature 1: Japanese Patent Laid-Open No. 2014-070510

SUMMARY OF INVENTION

Technical Problem

The technique described in Patent Literature 1 does not take into account how to respond to changes in the load on the gas turbine.

Therefore, the present invention aims to provide a technique that makes it possible to cool hot parts even during a load change while reducing the amount of cooling air used.

Solution to Problem

A control device of a gas turbine cooling system of a first aspect according to the present invention to achieve the above object is a control device of a gas turbine cooling system including:

a cooling air line that guides compressed air compressed by an air compressor of a gas turbine to a hot part coming in contact with combustion gas in the gas turbine;

a cooler that cools the compressed air in the cooling air line to produce cooling air;

a booster that pressurizes the cooling air in the cooling air line; and a flow rate adjuster that adjusts the flow rate of the cooling air supplied to the hot part through the cooling air line, the control device including:

a reception unit that receives a load command indicating a load on the gas turbine;

a load change determination unit that determines whether the load indicated by the load command received by the reception unit has changed;

a first command generation section that generates a first command indicating such an operation amount of the flow rate adjuster as allows the flow rate of the cooling air supplied to the hot part to meet a target flow rate that is determined according to an operation state of the gas turbine;

a second command generation section that, when the load change determination unit determines that the load indicated by the load command has changed, generates a second command indicating such an operation amount of the flow rate adjuster as allows a change-adapted flow rate higher than the target flow rate to be met; and a command output unit that outputs a flow rate adjuster command based on the second command to the flow rate adjuster when the second command generation section is generating the second command, and outputs a flow rate adjuster command based on the first command to the flow rate adjuster when the second command generation section is not generating the second command.

When the load on the gas turbine changes, the discharge pressure of the air compressor changes. As a result, the intake pressure of the booster changes as the discharge pressure of the air compressor changes. On the other hand, due to the presence of the cooling air line, the discharge pressure of the booster changes after a delay from the change in the discharge pressure of the air compressor. Thus, when the load on the gas turbine changes, the pressure ratio in the booster changes, so that the flow rate of the cooling air flowing through the booster changes, and as a result, the flow rate of the cooling air supplied to the hot parts changes. That is, when the load on the gas turbine changes, the flow rate of the cooling air transiently decreases according to this change. For this reason, when the load on the gas turbine changes, the performance of the cooling air cooling the hot parts may decrease.

In this control device, therefore, when the load change determination unit of the control device determines that the load has changed, the operation amount of the flow rate adjuster is set to an amount that allows the change-adapted flow rate to be met that is higher than the target flow rate of the cooling air to be met when the load is stable. Thus, this control device can avoid a decrease in the flow rate of the cooling air supplied to the hot parts during a load change.

A control device of a gas turbine cooling system of a second aspect according to the present invention to achieve the above object is the control device of a gas turbine cooling system of the first aspect, wherein the change-adapted flow rate is higher than the target flow rate by a predetermined percentage.

A control device of a gas turbine cooling system of a third aspect according to the present invention to achieve the above object is the control device of a gas turbine cooling system of the first or second aspect, wherein the second command generation section generates, as the second command, a command indicating such a feedforward target operation amount of the flow rate adjuster as allows the change-adapted flow rate to be met.

A control device of a gas turbine cooling system of a fourth aspect according to the present invention to achieve the above object is the control device of a gas turbine cooling system of the first aspect, wherein the second command generation section generates, as the second command, a command indicating a feedback operation amount of the flow rate adjuster that is determined so as to reduce a deviation between a target value related to the change-adapted flow rate and a current flow rate of the cooling air.

A control device of a gas turbine cooling system of a fifth aspect according to the present invention to achieve the above object is the control device of a gas turbine cooling system of any one of the first to fourth aspects, wherein, after the load change determination unit determines that the load indicated by the load command has changed, the second command generation section stops generating the second command when the load change determination unit determines that the change in the load indicated by the load command has ended.

In this control device, when the second command generation section stops generating the second command, the command output unit outputs the flow rate adjuster command based on the first command to the flow rate adjuster. Accordingly, when the change in the load stops, the operation amount of the flow rate adjuster is set to such an amount as allows the flow rate of the cooling air to meet a target flow rate that is to be met when the load is stable and that is lower than the change-adapted flow rate. Thus, this control device can reduce the flow rate of the cooling air supplied to the hot parts when the load is stable.

A control device of a gas turbine cooling system of a sixth aspect according to the present invention to achieve the above object is the control device of a gas turbine cooling system of any one of the first to fourth aspects, wherein, after the load change determination unit determines that the load indicated by the load command has changed, the second command generation section stops generating the second command when the change in the load indicated by the load command is determined to have ended and a predetermined second command stop condition is satisfied.

A control device of a gas turbine cooling system as another aspect according to the present invention to achieve the above object is a control device of a gas turbine cooling system including:

a cooling air line that guides compressed air compressed by an air compressor of a gas turbine to a hot part coming in contact with combustion gas in the gas turbine;

a cooler that cools the compressed air in the cooling air line to produce cooling air;

a booster that pressurizes the cooling air in the cooling air line; and a flow rate adjuster that adjusts an amount of cooling to which the compressed air is subjected by the cooler, the control device including:

a reception unit that receives a load command indicating a load on the gas turbine;

a load change determination unit that determines whether the load indicated by the load command received by the reception unit has changed;

a third command generation section that generates a third command indicating such an operation amount of the cooling amount adjuster as allows the temperature of the cooling air to meet a target temperature;

a fourth command generation section that; when the load change determination unit determines that the load indicated by the load command has changed, generates a fourth command indicating such an operation amount of the cooling amount adjuster as allows the temperature of the cooling air to meet a change-adapted temperature lower than the target temperature; and a command output unit that outputs a cooling amount adjuster command based on the fourth command to the cooling amount adjuster when the fourth command generation section is generating the fourth command, and outputs a cooling amount adjuster command based on the third command to the cooling amount adjuster when the fourth command generation section is not generating the fourth command.

A control device of a gas turbine cooling system of a seventh aspect according to the present invention to achieve the above object is any one of the above control devices of a gas turbine cooling system, wherein the gas turbine cooling system includes a cooling amount adjuster that adjusts an amount of cooling to which the compressed air is subjected by the cooler, and the control device further includes:

a third command generation section that generates a third command indicating such an operation amount of the cooling amount adjuster as allows the temperature of the cooling air to meet a target temperature;

a fourth command generation section that, when the load change determination unit determines that the load indicated by the load command has changed, generates a fourth command indicating such an operation amount of the cooling amount adjuster as allows the temperature of the cooling air to meet a change-adapted temperature lower than the target temperature; and a command output unit that outputs a cooling amount adjuster command based on the fourth command to the cooling amount adjuster when the fourth command generation section is generating the fourth command, and outputs a cooling amount adjuster command based on the third command to the cooling amount adjuster when the fourth command generation section is not generating the fourth command.

As described above, when the load on the gas turbine changes, the performance of the cooling air cooling the hot parts may decrease.

In this control device, therefore, when the load change determination unit determines that the load has changed, the operation amount of the cooling amount adjuster is set to such an amount as allows the change-adapted temperature to be met that is lower than a target temperature of the cooling air to be met when the load is stable. Thus, this control device can lower the temperature of the cooling air supplied to the hot parts during a load change.

A control device of a gas turbine cooling system of an eighth aspect according to the present invention to achieve the above object is the control device of a gas turbine cooling system of the seventh aspect, wherein the change-adapted temperature is lower than the target temperature by a predetermined percentage.

A control device of a gas turbine cooling system of a ninth aspect according to the present invention to achieve the above object is the control device of a gas turbine cooling system of the seventh or eighth aspect, wherein the fourth command generation section generates, as the fourth command, a command indicating such a feedforward target operation amount of the cooling amount adjuster as allows the change-adapted temperature to be met.

A control device of a gas turbine cooling system of a tenth aspect according to the present invention to achieve the above object is the control device of a gas turbine cooling system of the seventh aspect, wherein the fourth command generation section generates, as the fourth command, a command indicating a feedback operation amount of the cooling amount adjuster that is determined so as to reduce a deviation between a target value of the change-adapted temperature and a current temperature of the cooling air.

A control device of a gas turbine cooling system of an eleventh aspect according to the present invention to achieve the above object is the control device of a gas turbine cooling system of any one of the seventh to tenth aspects, wherein, after the load change determination unit determines that the load indicated by the load command has changed, the fourth command generation section stops generating the fourth command when the load change determination unit determines that the change in the load indicated by the load command has ended.

A control device of a gas turbine cooling system of a twelfth aspect according to the present invention to achieve the above object is the control device of a gas turbine cooling system of any one of the seventh to tenth aspects, wherein, after the load change determination unit determines that the load indicated by the load command has changed, the fourth command generation section stops generating the fourth command when the load change determination unit determines that the change in the load indicated by the load command has ended and a predetermined fourth command stop condition is satisfied.

A gas turbine cooling system of a thirteenth aspect according to the present invention to achieve the above object includes:
 any one of the above control devices;
 the cooling air line;
 the cooler;
 the booster; and
 the flow rate adjuster, wherein
 the flow rate adjuster is an intake valve that is provided in an intake air line of the cooling air line located on the side of the air compressor from the booster, and that adjusts the flow rate of the cooling air flowing through the intake air line.

A gas turbine cooling system of a fourteenth aspect according to the present invention to achieve the above object includes:
 any one of the above control devices;
 the cooling air line;
 the cooler;
 the booster; and
 the flow rate adjuster, wherein
 the cooling air line has an intake air line that guides compressed air compressed by the air compressor to the booster, a discharge line that guides air pressurized by the booster to the hot part, and a return line that returns air flowing through the discharge line to the intake air line, and
 the flow rate adjuster is a return valve that adjusts the flow rate of the air flowing through the return line.

A gas turbine cooling system of a fifteenth aspect according to the present invention to achieve the above object includes:
 any one of the above control devices;
 the cooling air line;
 the cooler;
 the booster; and
 the flow rate adjuster, wherein
 the flow rate adjuster is an inlet guide vane that is provided in a casing of the booster and adjusts the flow rate of the cooling air flowing into the casing.

A gas turbine cooling system of another aspect according to the present invention to achieve the above object includes:
 any one of the above control devices;
 the cooling air line;
 the cooler;
 the booster; and
 the flow rate adjuster, wherein
 the flow rate adjuster is a driving amount adjuster that is capable of adjusting a driving amount of the booster.

A gas turbine cooling system of a sixteenth aspect according to the present invention to achieve the above object includes:
 any one of the above control devices that have the third command generation section and the fourth command generation section;
 the cooling air line;
 the cooler;
 the booster;
 the flow rate adjuster; and
 the cooling amount adjuster, wherein
 the cooler is a heat exchanger that causes the compressed air and a coolant to exchange heat and cools the compressed, and
 the cooling amount adjuster is a coolant valve that adjusts the flow rate of the coolant flowing into the heat exchanger.

A gas turbine cooling system of another aspect according to the present invention to achieve the above object includes:
 any one of the above control devices that have the third command generation section and the fourth command generation section;
 the cooling air line;
 the cooler;
 the booster;
 the flow rate adjuster; and
 the cooling amount adjuster, wherein
 the cooler has a radiator through the inside of which the compressed air passes, and a fan that cools the radiator from outside, and
 the cooling amount adjuster is a driving amount adjuster that is capable of adjusting a driving amount of the fan.

A gas turbine facility of a seventeenth aspect according to the present invention to achieve the above object includes any one of the above gas turbine cooling systems and the gas turbine.

A control method of a gas turbine cooling system of an eighteenth aspect according to the present invention to achieve the above object is a control method of a gas turbine cooling system including:
 a cooling air line that guides compressed air compressed by an air compressor of a gas turbine to a hot part coining in contact with combustion gas in the gas turbine;
 a cooler that cools the compressed air in the cooling air line to produce cooling air;
 a booster that pressurizes the cooling air in the cooling air line; and
 a flow rate adjuster that adjusts the flow rate of the cooling air supplied to the hot part through the cooling air line,
 the control method including:
 a reception step of receiving a load command indicating a load on the gas turbine;
 a load change determination step of determining whether the load indicated by the load command received in the reception step has changed;
 a first command generation step of generating a first command indicating such an operation amount of the flow rate adjuster as allows the flow rate of the cooling air supplied to the hot part to meet a target flow rate that is determined according to an operation state of the gas turbine;

a second command generation step of, when it is determined in the load change determination step that the load indicated by the load command has changed, generating a second command indicating such an operation amount of the flow rate adjuster as allows a change-adapted flow rate higher than the target flow rate to be met; and a command output step of outputting a flow rate adjuster command based on the second command to the flow rate adjuster when the second command is being generated in the second command generation step, and outputting a flow rate adjuster command based on the first command to the flow rate adjuster when the second command is not being generated in the second command generation step.

As described above, when the load on the gas turbine changes, the flow rate of the cooling air transiently decreases according to this change, so that the performance of the cooling air cooling the hot parts may decrease.

In this control method, therefore, when it is determined in the load change determination step that the load has changed, the operation amount of the flow rate adjuster is set to such an amount as allows the change-adapted flow rate to be met that is higher than a target flow rate of the cooling air to be met when the load is stable. Thus, this control method can avoid a decrease in the flow rate of the cooling air supplied to the hot parts during a load change.

A control method of a gas turbine cooling system of a nineteenth aspect according to the present invention to achieve the above object is the control method of a gas turbine cooling system of the eighteenth aspect, wherein the change-adapted flow rate is higher than the target flow rate by a predetermined percentage.

A control method of a gas turbine cooling system of a twentieth aspect according to the present invention to achieve the above object is the control method of a gas turbine cooling system of the eighteenth or nineteenth aspect, wherein, in the second command generation step, a command indicating such a feedforward target operation amount of the flow rate adjuster as allows the change-adapted flow rate to be met is generated as the second command.

A control method of a gas turbine cooling system of a twenty-first aspect according to the present invention to achieve the above object is the control method of a gas turbine cooling system of the eighteenth aspect, wherein, in the second command generation step, a command indicating a feedback operation amount of the flow rate adjuster that is determined so as to reduce a deviation between a target value related to the change-adapted flow rate and a current flow rate of the cooling air is generated as the second command.

A control method of a gas turbine cooling system of a twenty-second aspect according to the present invention to achieve the above object is the control method of a gas turbine cooling system of any one of the eighteenth to twenty-first aspects, wherein, after it is determined in the load change determination step that the load indicated by the load command has changed, generation of the second command is stopped in the second command generation step when it is determined that the change in the load indicated by the load command has ended.

A control method of a gas turbine cooling system of a twenty-third aspect according to the present invention to achieve the above object is the control method of a gas turbine cooling system of any one of the eighteenth to twenty-first aspects, wherein, after it is determined in the load change determination step that the load indicated by the load command has changed, generation of the second command is stopped in the second command generation step when it is determined that the change in the load indicated by the load command has ended and a predetermined second command stop condition is satisfied.

A control method of a gas turbine cooling system as another aspect according to the present invention to achieve the above object is a control method of a gas turbine cooling system including:

a cooling air line that guides compressed air compressed by an air compressor of a gas turbine to a hot part coming in contact with combustion gas in the gas turbine;

a cooler that cools the compressed air in the cooling air line to produce cooling air;

a booster that pressurizes the cooling air in the cooling air line; and a cooling amount adjuster that adjusts an amount of cooling to which the compressed air is subjected by the cooler, the control method including:

a reception step of receiving a load command indicating a load on the gas turbine;

a load change determination step of determining whether the load indicated by the load command received in the reception step has changed;

a third command generation step of generating a third command indicating such an operation amount of the cooling amount adjuster as allows the temperature of the cooling air to meet a target temperature;

a fourth command generation step of, when it is determined in the load change determination step that the load indicated by the load command has changed, generating a fourth command indicating such an operation amount of the cooling amount adjuster as allows the temperature of the cooling air to meet a change-adapted temperature lower than the target temperature; and a command output step of outputting a cooling amount adjuster command based on the fourth command to the cooling amount adjuster when the fourth command is being generated in the fourth command generation step, and outputting a cooling amount adjuster command based on the third command to the cooling amount adjuster when the fourth command is not being generated in the fourth command generation step.

A control method of a gas turbine cooling system of a twenty-fourth aspect according to the present invention to achieve the above object is any one of the above control methods of a gas turbine cooling system, wherein the gas turbine cooling system includes a cooling amount adjuster that adjusts an amount of cooling to which the compressed air is subjected by the cooler, and the control method further includes:

a third command generation step of generating a third command indicating such an operation amount of the cooling amount adjuster as allows the temperature of the cooling air to meet a target temperature;

a fourth command generation step of, when it is determined in the load change determination step that the load indicated by the load command has changed, generating a fourth command indicating such an operation amount of the cooling amount adjuster as allows the temperature of the cooling air to meet a change-adapted temperature lower than the target temperature; and a command output step of outputting a cooling amount adjuster command based on the fourth command to the cooling amount adjuster when the fourth command is being generated in the fourth command generation step, and outputting a cooling amount adjuster command based on the third command to the cooling amount adjuster when the fourth command is not being generated in the fourth command generation step.

As described above, when the load on the gas turbine changes, the performance of the cooling air cooling the hot parts may decrease.

In this control method, therefore, when it is determined in the load change determination step that the load has changed, the operation amount of the cooling amount adjuster is set to such an amount as allows the change-adapted temperature to be met that is lower than a target temperature of the cooling air to be met when the load is stable. Thus, this control method can lower the temperature of the cooling air supplied to the hot parts during a load change.

A control method of a gas turbine cooling system of a twenty-fifth aspect according to the present invention to achieve the above object is the control method of a gas turbine cooling system of the twenty-fourth aspect, wherein the change-adapted temperature is lower than the target temperature by a predetermined percentage.

A control method of a gas turbine cooling system of a twenty-sixth aspect according to the present invention to achieve the above object is the control method of a gas turbine cooling system of the twenty-fourth or twenty fifth aspect, wherein, in the fourth command generation step, a command indicating such a feedforward target operation amount of the cooling amount adjuster as allows the change-adapted temperature to be met is generated as the fourth command.

A control method of a gas turbine cooling system of a twenty-seventh aspect according to the present invention to achieve the above object is the control method of a gas turbine cooling system of the twenty-fourth aspect, wherein, in the fourth command generation step, a command indicating a feedback operation amount of the cooling amount adjuster that is determined so as to reduce a deviation between a target value of the change-adapted temperature and a current temperature of the cooling air is generated as the fourth command.

A control method of a gas turbine cooling system of a twenty-eighth aspect according to the present invention to achieve the above object is the control method of a gas turbine cooling system of any one of the twenty-fourth to twenty-seventh aspects, wherein, after it is determined in the load change determination step that the load indicated by the load command has changed, generation of the fourth command is stopped in the fourth command generation step when it is determined in the load change determination step that the change in the load indicated by the load command has ended.

A control method of a gas turbine cooling system of a twenty-ninth aspect according to the present invention to achieve the above object is the control method of a gas turbine cooling system of any one of the twenty-fourth to twenty-eighth aspects, wherein, after it is determined in the load change determination step that the load indicated by the load command has changed, generation of the fourth command is stopped in the fourth command generation step when it is determined in the load change determination step that the change in the load indicated by the load command has ended and a predetermined fourth command stop condition is satisfied.

Advantageous Effects of Invention

According to an aspect of the present invention, it is possible to avoid a decrease in the flow rate of cooling air supplied to hot parts during a load change. Therefore, according to the aspect of the present invention, when the load is stable, the cooling air does not need to be supplied to the hot parts at a higher flow rate so as to allow for a load change. Thus, this aspect of the present invention makes it possible to sufficiently cool the hot parts even during a load change while reducing the amount of cooling air used when the load is stable.

BRIEF DESCRIPTION OF DRAWINGS

FIG. 4($b$) shows changes in an actual load; FIG. 4($c$) shows changes in an operation amount of an intake valve; and FIG. 4($d$) shows changes in a coolant valve.

FIG. 5($b$) shows changes in the actual load; FIG. 5($c'$) shows changes in an operation amount of a return valve; and FIG. 5($d$) shows changes in the coolant valve.

FIG. 7 is a functional block diagram of a control device in a second embodiment according to the present invention.

DESCRIPTION OF EMBODIMENTS

First Embodiment

In the following, a first embodiment of a gas turbine facility according to the present invention will be described in detail with reference to FIG. 1 to FIG. 6.

Figure 1:
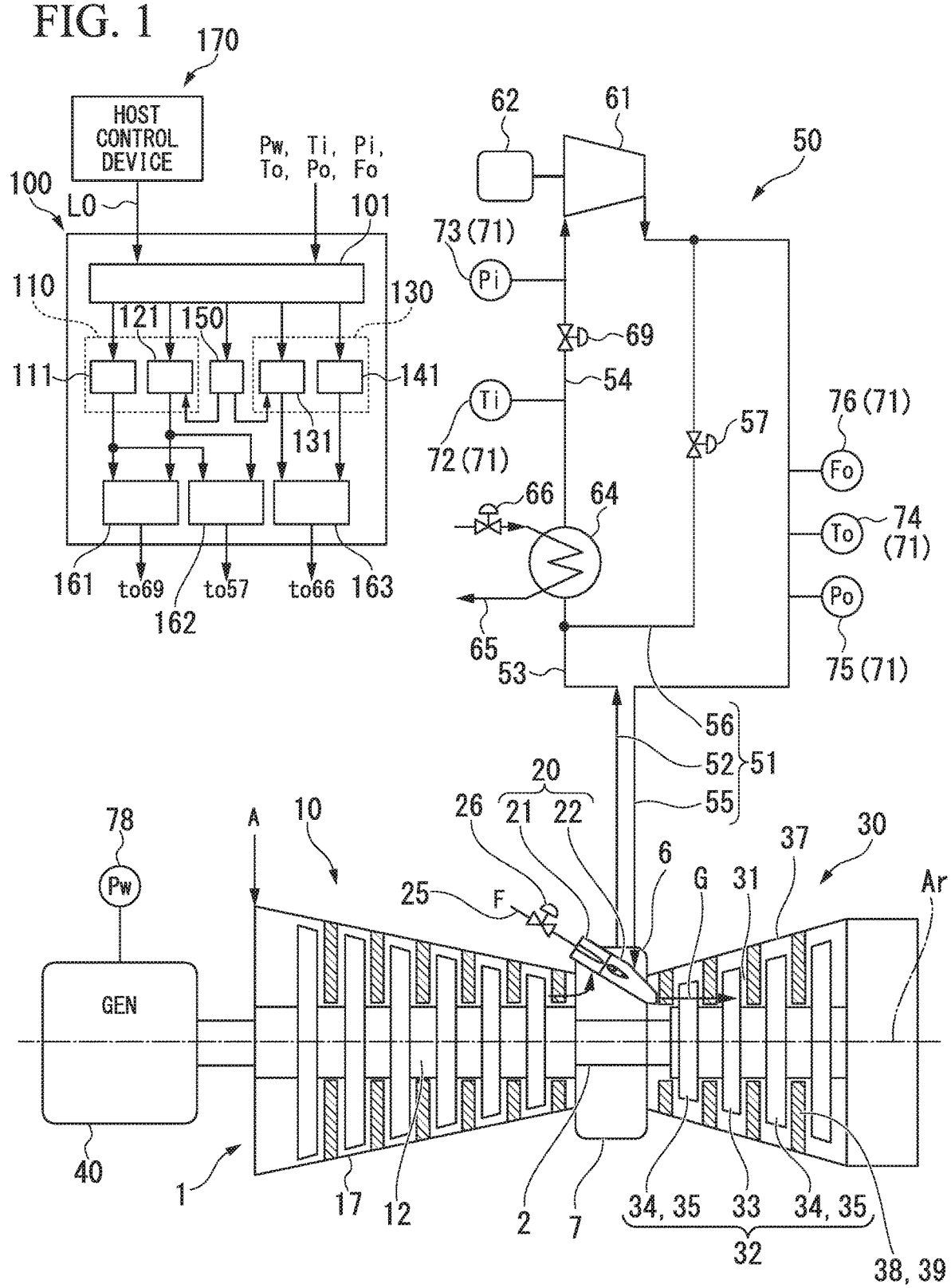
FIG. 1 is a system diagram of a gas turbine facility in a first embodiment according to the present invention.

As shown in FIG. 1, the gas turbine facility of this embodiment includes a gas turbine 1, and a gas turbine cooling system (hereinafter referred to simply as the cooling system) 50 that cools hot parts of the gas turbine 1.

The gas turbine 1 includes an air compressor 10 that generates compressed air by compressing outside air A, a combustor 20 that generates combustion gas G by combusting fuel F from a fuel supply source in the compressed air, and a turbine 3C) that is driven by the combustion gas G.

The air compressor 10 has a compressor rotor 12 that rotates around an axis Ar, and a compressor casing 17 that covers the compressor rotor 12. The turbine 30 has a turbine rotor 32 that rotates around the axis Ar, and a turbine casing 37 that covers the turbine rotor 32. The compressor rotor 12 and the turbine rotor 32 are located on the same axis Ar, and are coupled together to form a gas turbine rotor 2. The gas turbine 1 further includes an intermediate casing 6 that is disposed between the compressor casing 17 and the turbine casing 37. The combustor 20 is mounted on the intermediate casing 6. The compressor casing 17, the intermediate casing 6, and the turbine casing 37 are coupled together to form a gas turbine casing 7. Hereinafter, a direction in which the axis Ar extends will be referred to as an axial direction. In the axial direction, the side on which the air compressor 10 is present relative to the turbine 30 will be referred to as an axially upstream side, and the opposite side from the axially upstream side will be referred to as an axially downstream side.

The turbine rotor 32 has a rotor shaft 33, and a plurality of blade rows 34 that are mounted on the rotor shaft 33. The plurality of blade rows 34 are arrayed in the axial direction. Each blade row 34 has a plurality of blades 35 that are arrayed in a circumferential direction of the axis Ar. The turbine 30 further has a plurality of vane rows 38 that are fixed on an inner circumferential side of the turbine casing 37. The vane rows 38 are each disposed on the axially upstream side of one blade row 34. Each vane row 38 has a plurality of vanes 39 that are arrayed in the circumferential direction of the axis Ar. An annular space between the inner circumferential side of the turbine casing 37 and an outer circumferential side of the rotor shaft 33 forms a combustion gas flow passage 31 through which the combustion gas G flows.

The combustor 20 has a combustion liner 22 through which the combustion gas G is sent to the combustion gas flow passage 31 of the turbine 30, and a fuel injector 21 that injects the fuel F and the compressed air into the combustion liner 22. A fuel line 25 through which the fuel F is sent to the fuel injector 21 is connected to the fuel injector 21. A fuel valve 26 that adjusts the flow rate of the fuel F flowing through the fuel line 25 is provided in the fuel line 25.

Of various parts composing the gas turbine 1, the combustion liner 22 of the combustor 20, the blades 35, and the vanes 39 each constitute a hot part that is exposed to the combustion gas G.

A generator 40 is connected to the gas turbine rotor 2. The generator 40 is provided with an output meter 78 that detects output of the generator 40.

The cooling system 50 includes a cooling air line 51, a booster 61, a cooler 64, a detector 71, and a control device 100.

The cooling air line 51 is connected to the intermediate casing 6 and connected to the combustion liner 22 that is one of the hot parts. The cooling air line 51 guides the compressed air having flowed from the air compressor 10 into the intermediate casing 6 to the combustion liner 22. The cooler 64 cools the compressed air in the cooling air line 51 to produce cooling air. For example, the cooler 64 is a heat exchanger that causes the compressed air in the cooling air line 51 and a coolant to exchange heat and thereby cools the compressed air. A coolant line 65 through which the coolant is sent to the cooler 64 is connected to the cooler. A coolant valve 66 that adjusts the flow rate of the coolant flowing through the coolant line 65 is provided in the coolant line 65. The coolant valve 66 functions as a cooling amount adjuster that adjusts the flow rate of the coolant and thereby adjusts an amount of cooling to which the compressed air is subjected by the cooler 64. The booster 61 pressurizes the cooling air in the cooling air line 51. For example, the booster 61 is a centrifugal compressor or an axial compressor. The booster 61 is driven by a motor 62.

The cooling air line 51 includes an intake air line 52 that guides the compressed air in the intermediate casing 6 to the booster 61, a discharge line 55 that guides the air compressed by the booster 61 to the combustion liner 22, and a return line 56 that returns part of the air flowing through the discharge line 55 to the intake air line 52. Hereinafter, of the intake air line 52, a part front the intermediate casing 6 to the cooler 64 will be referred to as an uncooled intake air line 53, and a part from the cooler 64 to the booster 61 will be referred to as a cooled intake air line 54. An intake valve 69 is provided in the cooled intake air line 54. The intake valve 69 adjusts the flow rate of the cooling air flowing through the cooled intake air line 54, i.e., the cooling air to be suctioned by the booster 61. Thus, the intake valve 69 functions as a flow rate adjuster that controls the flow rate of the cooling air supplied to the combustion liner 22 through the cooling air line 51. The return line 56 connects the discharge line 55 and the uncooled intake air line 53 to each other. A return valve 57 is provided in the return line 56. The return valve 57 adjusts the flow rate of the cooling air flowing through the return line 56, and thereby indirectly adjusts the flow rate of the cooling air flowing through the discharge line 55. Thus, the return valve 57 also functions as a flow rate adjuster that controls the flow rate of the cooling air supplied to the combustion liner 22.

The detector 71 includes an intake air temperature indicator 72 that detects a temperature Ti of the cooling air flowing through the cooled intake air line 54, an intake air pressure indicator 73 that detects a pressure Pi of the cooling air flowing through the cooled intake air line 54, a discharge temperature indicator 74 that detects a temperature To of the cooling air flowing through the discharge line 55, a discharge pressure indicator 75 that detects a pressure Po of the cooling air flowing through the discharge line 55, and a discharge flowmeter 76 that detects a volume flow rate Fo of the cooling air flowing through the discharge line 55.

Before describing the control system 100, a method of controlling the flow rate of the cooling air supplied from the cooling system 50 to the combustion liner 22 will be described below.

As described above, the compressed air extracted from the intermediate casing 6 is cooled by the cooler 64 provided in the intake air line 52, and is suctioned by the booster 61 via the intake valve 69. Part of the cooling air pressurized by the booster 61 is returned from the return line 56 having the return valve 57 to the intake air line 52, while the rest of the cooling air is supplied to the combustion liner 22 through the discharge line 55. The return line 56 is a line that is provided to prevent the operation region of the booster 61 from entering a surge region, and thus to protect the booster 61. The flow rate of the cooling air flowing through the discharge line 55 during normal operation of the booster 61 is adjusted through opening-closing control of the intake valve 69 and the return valve 57. However, if the intake valve 69 and the return valve 57 are controlled at the same time, the control becomes unstable due to mutual interference. In this embodiment, therefore, to avoid mutual interference in the control of these control valves (the intake valve 69 and the return valve 57), split control is performed by dividing valve operation commands (hereinafter referred to as reference valve commands) for these control valves into a high-load flow rate region and a low-load flow rate region of the cooling air. In this split control, when the command value of the reference valve command is not smaller than a predetermined value, the degree of opening of the intake valve 69 is exclusively controlled, whereas when the command value of the reference valve command is smaller than the predetermined value, the degree of opening of the return valve 57 is exclusively controlled.

Figure 6:
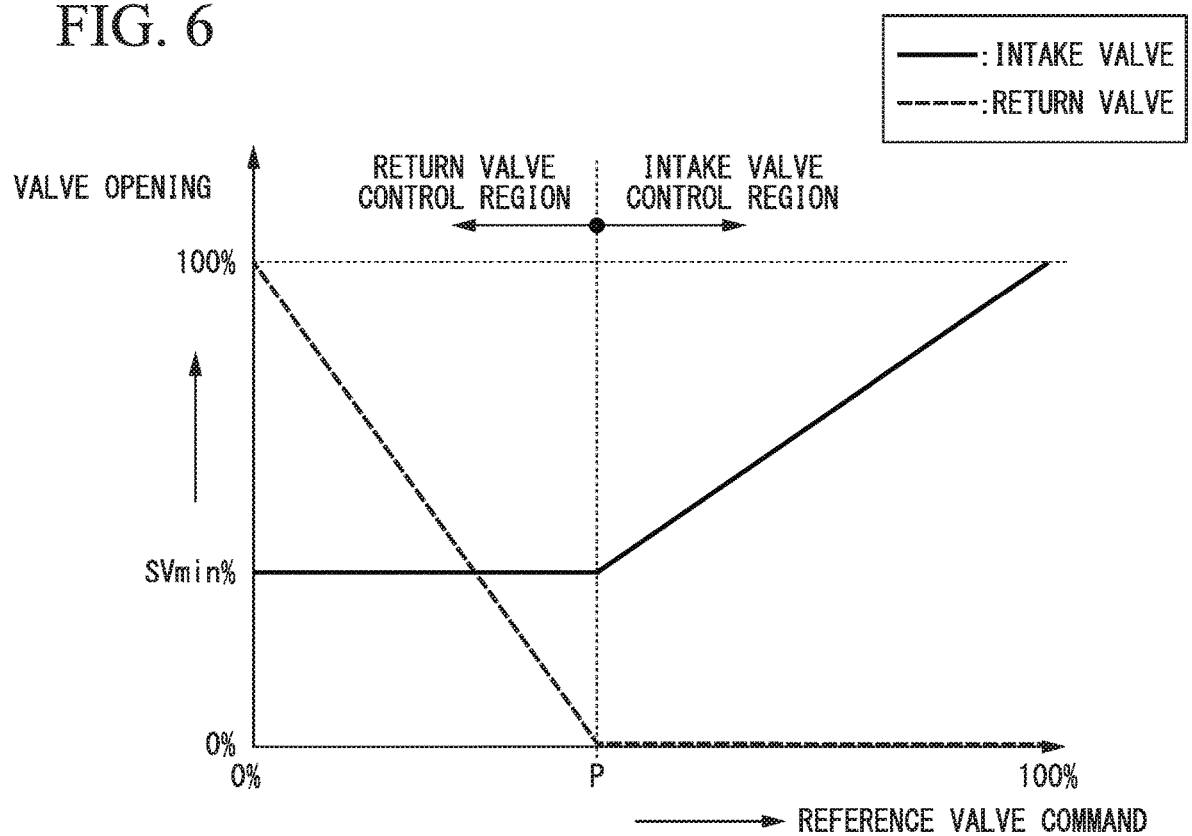
FIG. 6 is a view illustrating the concept of split control in the first embodiment according to the present invention.

The split control will be specifically described with reference to FIG. 6. The vertical axis in FIG. 6 shows the degree of valve opening (%) indicated by an intake valve command and a return valve command. The horizontal axis shows the command value of the reference valve command. The solid line shows the degree of opening of the intake valve command, and the dashed line shows the degree of opening of the return valve command.

The region in which the command value of the reference valve command is 50% or larger will be regarded as the high-load flow rate region (intake valve control region). The region in which the command value of the reference valve command is smaller than 50% will be regarded as the low-load flow rate region (return valve control region). A threshold point at which the command values of the reference valve commands are divided into the high-load flow rate region and the low-load flow rate region will be referred to as a split point P. The command value 50% of the reference valve command serving as the split point P is merely an example, and the split point P is not limited to this value.

When the command value of the reference valve command is in the high-load flow rate region, the degree of opening indicated by an intake valve command FCC) is set to a degree of opening that changes with a positive correlation with changes in the command value of the reference valve command. On the other hand, the degree of opening indicated by a return valve command FrCO when the command value of the reference valve command is in the high-load flow rate region is set to 0% (full closure). When the load on the gas turbine 1 increases, the required amount of cooling air increases. Therefore, in the high-load flow rate region, the degree of opening indicated by the intake valve command FCO is increased as the command value of the reference valve command that changes with a positive correlation with the load on the gas turbine 1 increases. Conversely, when the load on the gas turbine 1 decreases, the required amount of cooling air decreases. Therefore, in the high-load flow rate region, the degree of opening indicated by the intake valve command FCO is reduced as the command value of the reference valve command that changes with a positive correlation with the load on the gas turbine 1 decreases. The degree of opening indicated by the intake valve command FCO becomes a minimum degree of opening SVmin at the split point P. For example, the minimum degree of opening SVmin is 20%. However, the minimum degree of opening SVmin of 20% is merely an example, and the minimum degree of opening SVmin is not limited to this value.

When the command value of the reference valve command is in the low-load flow rate region, the degree of opening indicated by the intake valve command FCO is set to the minimum degree of opening SVmin. Also when the command value of the reference valve command is in the low-load flow rate region, the required amount of cooling air decreases if the load on the gas turbine 1 decreases. Therefore, when the command value of the reference valve command is in the low-load flow rate region, the flow rate of the cooling air flowing through the booster 61 decreases if the degree of opening of the intake valve 69 is reduced as the load on the gas turbine 1 decreases. When the flow rate of the cooling air flowing through the booster 61 has decreased to or below a certain value, the operation region of the booster 61 enters the surge region. This means that there is an increased risk of surging in the booster 61. Therefore, when the command value of the reference valve command is in the low-load flow rate region, the degree of opening of the return valve is changed while the degree of opening indicated by the intake valve command FCO is maintained at the minimum degree of opening SVmin. When the command value of the reference valve command is in the low-load flow rate region, the degree of opening indicated by the return valve command FrCO is set to a degree of opening that changes with a negative correlation with changes in the command value of the reference valve command. Thus, in the low-load flow rate region, the degree of opening indicated by the return valve command FrCO is reduced as the degree of opening of the reference valve command that changes with a positive correlation with the load on the gas turbine 1 increases. The degree of opening indicated by the intake valve command FCO becomes the minimum degree of opening SVmin at the split point P, and becomes a maximum degree of opening of 100% when the command value of the reference valve command is 100%. The degree of opening indicated by the return valve command FrCO becomes 100% (full opening) when the command value of the reference valve command is 0%, and becomes 0% (full closure) at the split point P.

Figure 2:
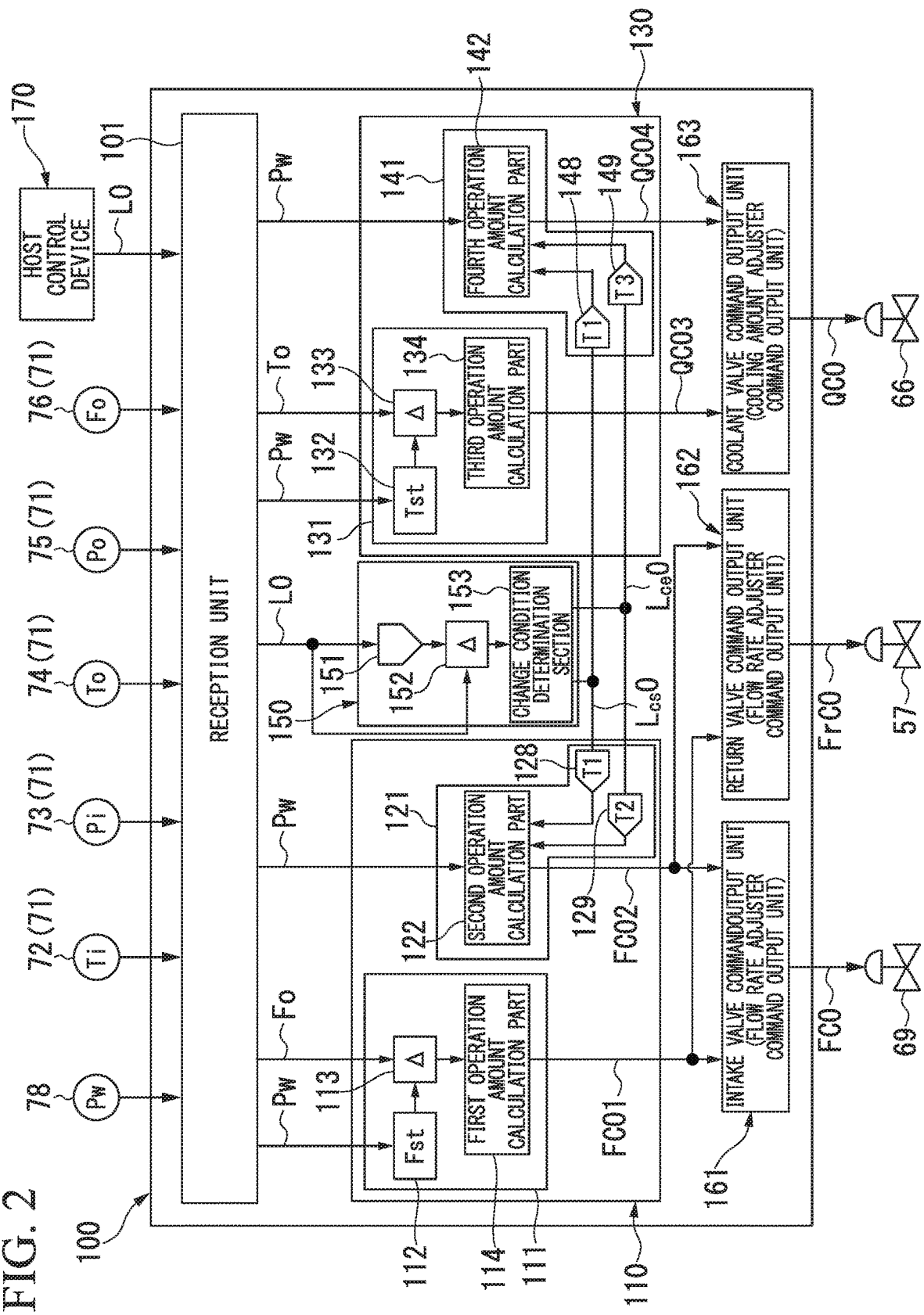
FIG. 2 is a functional block diagram of a control device in the first embodiment according to the present invention.

As shown in FIG. 2, the control device 100 has a reception unit 101, a flow rate adjuster command generation unit 110, a coolant valve command generation unit (cooling amount adjuster command generation unit) 130, a load change determination unit 150, an intake valve command output unit (flow rate adjuster command output unit) 161, a return valve command output unit (flow rate adjuster command output unit) 162, and a coolant valve command output unit (cooling amount adjuster command output unit) 163.

The reception unit 101 receives a state amount of the cooling air detected by the detector 71, an output (load) detected by the output meter 78, and a load command LO from a host control device 170. Here, the load refers to the load on the gas turbine 1, i.e., the output of the generator 40. Accordingly, the load command LO is a command specifying a load to be put on the gas turbine 1.

The load change determination unit 150 has a command delay section 151, a load deviation computation section 152, and a change condition determination section 153. The command delay section 151 receives the load command LO that has been received by the reception unit 101, and outputs this load command LO after a predetermined time. The load deviation computation section 152 obtains a deviation between the load indicated by the load command LO received by the reception unit 101 and the load indicated by the load command LO output from the command delay section 151. When the deviation obtained by the load deviation computation section 152 is not smaller than a predetermined value and the state where the deviation is not smaller than the predetermined value continues for a predetermined time, the change condition determination section 153 outputs a change detection command LcsO indicating that the load has changed. After determining that the load has changed, when the deviation obtained by the load deviation computation section 152 is smaller than the predetermined value and the state where the deviation is smaller than the predetermined value continues for a predetermined time, the change condition determination section 153 outputs a change end command LceO indicating that the load change has ended.

The flow rate adjuster command generation unit 110 has a first command generation section 111 and a second command generation section 121. The first command generation section 111 generates a first command FCO1 indicating an operation amount (degree of opening) of the flow rate adjusters (the intake valve 69 and the return vale 57)

according to the state amount detected by the detector 71. The second command generation section 121 generates a second command FCO2 indicating an operation amount (degree of opening) of the flow rate adjusters during a load change.

The first command generation section 111 has a target flow rate generation part 112, a flow rate deviation computation part 113, and a first operation amount calculation part 114. The target flow rate generation part 112 generates a target flow rate Fst of the cooling air flowing through the discharge line 55 that is in accordance with the operation state of the gas turbine 1. Here, a load Pw on the gas turbine 1 detected by the output meter 78 is used as the operation state of the gas turbine 1. The target flow rate generation part 112 generates the target flow rate Fst that has a positive correlation with changes in the load Pw on the gas turbine 1. Although the load. Pw on the gas turbine 1 detected by the output meter 78 is used as the operation state of the gas turbine 1 here, the load indicated by the load command LO may instead be used. Other than these loads, the temperature of the air suctioned by the air compressor 10, the temperature of exhaust gas discharged from the gas turbine 1, etc. may also be taken into account in determining the target flow rate Fst. The flow rate deviation computation part 113 obtains a deviation between the flow rate Fo of the cooling air detected by the discharge flowmeter 76 and the target flow rate Fst. The flow rate of the cooling air passing through the booster 61 is determined by a pressure ratio that is a ratio between the inlet pressure of the intake valve 69 and the discharge pressure of the booster 61 and by the degree of valve opening. The first operation amount calculation part 114 calculates a first operation amount that is a feedback operation amount according to this deviation, and outputs the first command FCO1 indicating this operation amount.

As described above, the target flow rate Fst has a positive correlation with changes in the load Pw on the gas turbine 1. Accordingly, the first command FCO1 for the flow rate adjusters based on the target flow rate Fst also basically has a positive correlation with changes in the load Pw on the gas turbine 1.

The second command generation section 121 has a second operation amount calculation part 122, a command first delay part 128, and a command second delay part 129. The second operation amount calculation part 122 calculates a second operation amount that is a feedforward target operation amount of the flow rate adjusters according to the operation state of the gas turbine 1, and outputs the second command FCO2 indicating this operation amount. Here, again, the load Pw on the gas turbine 1 detected by the output meter 78 is used as the operation state of the gas turbine 1. The second operation amount calculation part 122 calculates the second operation amount that has a positive correlation with changes in the load Pw on the gas turbine 1. This second operation amount is a feedforward target operation amount that allows a change-adapted flow rate to be met that is higher than the target flow rate Fst, generated by the target flow rate generation part 112 of the first command generation section 111, by a predetermined percentage of the target flow rate Fst. The second operation amount indicated by the second command FCO2 is larger than the first operation amount indicated by the first command FCO1. Although the load Pw on the gas turbine 1 detected by the output meter 78 is used as the operation state of the gas turbine 1 here again, the load indicated by the load command LO may instead be used. Other than these loads, the temperature of the air suctioned by the air compressor 10, the temperature of the exhaust gas discharged from the gas turbine 1, etc. may also be taken into account in determining the feedforward target operation amount. The command first delay part 128 outputs the change detection command LcsO received from the load change determination unit 150 after a delay of a first time T1. The command second delay part 129 outputs the change end command LceO received from the load change determination unit 150 after a delay of a second time T2. The second time T2 is longer than the first time T1. A second command stop condition is the second time T2, for example. When the second operation amount calculation part 122 receives the change detection command LcsO from the command first delay part 128, the second operation amount calculation part 122 outputs the second command FCO2. When the second operation amount calculation part 122 receives the change end command LceO from the command second delay part 129, the second operation amount calculation part 122 stops outputting the second command FCO2.

The coolant valve command generation unit 130 has a third command generation section 131 and a fourth command generation section 141. The third command generation section 131 generates a third command QCO3 indicating an operation amount (degree of opening) of the coolant valve 66 according to the state amount detected by the detector 71. The fourth command generation section 141 generates a fourth command QCO4 indicating an operation amount (degree of opening) of the coolant valve 66 during a load change.

The third command generation section 131 has a target temperature generation part 132, a temperature deviation computation part 133, and a third operation amount calculation part 134. The target temperature generation part 132 generates a target temperature Tst of the cooling air according to the operation state of the gas turbine 1. Here, the load Pw on the gas turbine 1 detected by the output meter 78 is used as the operations state of the gas turbine 1. The target temperature generation part 132 generates the target temperature Tst that has a negative correlation with changes in the load on the gas turbine 1. Although the load Pw on the gas turbine 1 detected by the output meter 78 is used as the operation state of the gas turbine 1 here, the load indicated by the load command LO may instead be used. Other than these loads, the temperature of the air suctioned by the air compressor 10, the temperature of the exhaust gas discharged from the gas turbine 1, etc. may also be taken into account in determining the target temperature Tst. The temperature deviation computation part 133 obtains a deviation between the temperature To of the cooling air detected by the discharge temperature indicator 74 and the target temperature Tst. The third operation amount calculation part 134 calculates a third operation amount that is a feedback operation amount according to this deviation, and outputs the third command QCO3 indicating this operation amount.

The fourth command generation section 141 has a fourth operation amount calculation part 142, a command third delay part 148, and a command fourth delay part 149. The fourth operation amount calculation part 142 calculates a fourth operation amount that is a feedforward target operation amount of the coolant valve 66 according to the operation state of the gas turbine 1, and outputs the fourth command QCO4 indicating this operation amount. Here, again, the load Pw on the gas turbine 1 detected by the output meter 78 is used as the operation state of the gas turbine 1. The fourth operation amount calculation part 142 calculates the fourth operation amount that has a negative correlation with changes in the load Pw on the gas turbine 1. This fourth operation amount is a feedforward target operation amount that allows a change-adapted temperature to be met that is lower than the target temperature Tst, generated by the target temperature generation part 132 of the third command generation section 131, by a predetermined percentage of the target temperature Tst. Thus, the fourth operation amount is larger than the third operation amount. Although the load Pw on the gas turbine 1 detected by the output meter 78 is used as the operation state of the gas turbine 1 here again, the load indicated by the load command LO may instead be used. Other than these loads, the temperature of the air suctioned by the air compressor 10, the temperature of the exhaust gas discharged from the turbine, etc. may also be taken into account in determining the feedforward target operation amount. The command third delay part 148 outputs the change detection command LcsO received from the load change determination unit 150 after a delay of the first time T1. The command fourth delay part 149 outputs the change end command LceO received from the load change determination unit 150 after a delay of a third time T3. The third time T3 is longer than the first time T1 and the above-mentioned second time T2. A fourth command stop condition is the third time T3, for example. When the fourth operation amount calculation part 142 receives the change detection command LcsO from the command third delay part 148, the fourth operation amount calculation part 142 outputs the fourth command QCO4. When the fourth operation amount calculation part 142 receives the change end command LceO from the command fourth delay part 149, the fourth operation amount calculation part 142 stops outputting the fourth command QCO4.

When the command value of the flow rate adjuster command (reference valve command) from the flow rate adjuster command generation unit 110 is in the high-load flow rate region relative to the split point P, and the second command generation section 121 is generating the second command FCO2, the intake valve command output unit (flow rate adjuster command output unit) 161 outputs the intake valve command (flow rate adjuster command) FCO based on the second command FCO2 to the intake valve 69. On the other hand, when the command value of the flow rate adjuster command is in the high-load flow rate region relative to the split point P. and the second command generation section 121 is not generating the second command FCO2, the intake valve command output unit 161 outputs the intake valve command (flow rate adjuster command) FCO based on the first command FCO1 from the first command generation section 111 to the intake valve 69. The intake valve command FCO is a command obtained by changing the form of the first command FCO1 and the second command FCO2, which are the flow rate adjuster commands, to a form adapted to control the intake valve 69.

When the command value of the flow rate adjuster command (reference valve command) is in the low-load flow rate region relative to the split point P, and the second command generation section 121 is generating the second command FCO2, the return valve command output unit (flow rate adjuster command output unit) 162 outputs the return valve command (flow rate adjuster command) FrCO based on the second command FCO2 to the return valve 57. On the other hand, when the command value of the flow rate adjuster command is in the low-load flow rate region relative to the split point P, and the second command generation section 121 is not generating the second command FCO2, the return valve command output unit 162 outputs the return valve command (flow rate adjuster command) FrCO based on the first command. FCO1 from the first command generation section 111 to the return valve 57. The return valve command FrCO is also obtained by changing the form of the first command FCO1 and the second command FCO2, which are the flow rate adjuster commands, to a form adapted to control the return valve 57.

As described above, the first command FCO1 and the second command FCO2 as the flow rate adjuster commands have a positive correlation with changes in the load Pw on the gas turbine 1. Moreover, the operation amount (degree of opening) indicated by the intake valve command FCO based on the first command FCO1 or the second command FCO2 has a positive correlation with the operation amount (degree of opening) indicated by the first command FCO1 or the second command FCO2. Accordingly, the operation amount (degree of opening) indicated by the intake valve command FCO is such that, when the load Pw on the gas turbine 1 increases, the operation amount (degree of opening) indicated by the intake valve command FCO also increases. By contrast, the operation amount (degree of opening) of the return valve 57 indicated by the return valve command FrCO based on the first command FCO1 or the second command FCO2 is complementary to the degree of opening of the intake valve indicated by the intake valve command FCO based on the same first command FCO1 or second command FCO2. Thus, when the degree of opening indicated by the first command FCO1 or the second command FCO2 increases, the degree of opening of the intake valve 69 indicated by the intake valve command FCO based on this flow rate adjuster command increases, while the degree of opening of the return valve 57 indicated by the return valve command FrCO based on this flow rate adjuster commands decreases.

When the fourth command generation section 141 is generating the fourth command QCO4, the coolant vale command output unit (cooling amount adjuster command output unit) 163 outputs a coolant valve command (cooling amount adjuster command) QCO based on the fourth command QCO4 to the coolant valve 66. On the other hand, when the fourth command generation section 141 is not generating the fourth command QCO4, the coolant valve command output unit 163 outputs the coolant valve command (cooling amount adjuster command) coolant valve command output unit based on the third command QCO3 from the third command generation section 131 to the coolant valve 66. The coolant valve command QCO is a command obtained by changing the form of the third command QCO3 or the fourth command QCO4 to a form adapted to control the coolant valve 66.

Figure 3:
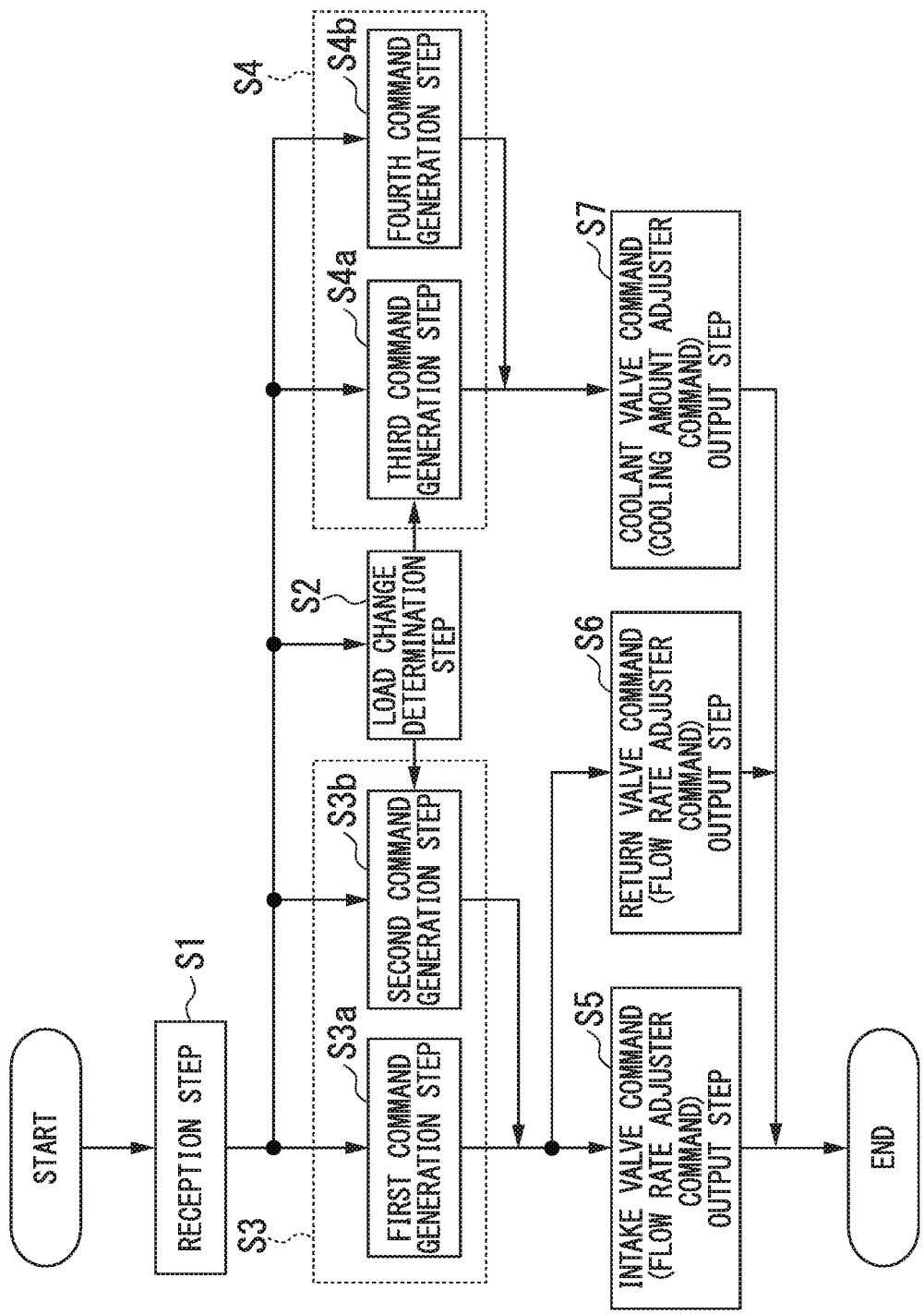
FIG. 3 is a flowchart showing operations of the control device in the first embodiment according to the present invention.

Next, operations of the control device 100 will be described in accordance with the flowchart shown in FIG. 3.

The detector 71 constantly detects the state amount of the cooling air and sends this state amount to the control device 100 (detection step).

The reception unit 101 of the control device 100 receives the load command LO from the host control device 170, and receives, at any time, the state amount of the cooling air detected by the detector 71 and the load Pw detected by the output meter 78 (S1: reception step).

The load change determination unit 150 of the control device 100 determines whether the load indicated by the load command LO has changed (S2: load change determination step). As described above, the command delay section 151 of the load change determination unit 150 receives the load command LO received by the reception unit 101, and outputs this load command LO after a predetermined time. The load deviation computation section 152 obtains a deviation between the load indicated by the load command LO received by the reception unit 101 and the load indicated by the load command LO output from the command delay section 151. When the deviation obtained by the load deviation computation section 152 is not smaller than a predetermined value and the state where the deviation is not smaller than the predetermined value continues for a predetermined time, the change condition determination section 153 outputs the change detection command LcsO indicating that the load has changed. After determining that the load has changed, when the deviation obtained by the load deviation computation section 152 is smaller than the predetermined value and the state where the deviation is smaller than the predetermined value continues for a predetermined time, the change condition determination section 153 outputs the change end command LceO indicating that the load change the has ended.

The flow rate adjuster command generation unit 110 of the control device 100 generates a command for the intake valve 69 and the return valve 57, i.e., the flow rate adjuster command (S3: flow rate adjuster command generation step). In parallel with this flow rate adjuster command generation step (S3), the coolant valve command generation unit 130 of the control device 100 generates a command for the coolant valve 66 (S4: coolant valve command (cooling amount adjuster command) generation step).

In the flow rate adjuster command generation step (S3), the first command generation section 111 generates the first command FCO1 for the flow rate adjusters (the intake valve 69 and the return valve 57) (S3a: first command generation step), in the first command generation step (S3a), the flow rate deviation computation part 113 of the first command generation section 111 obtains a deviation between the target flow rate Fst according to the operation state of the gas turbine 1 and the flow rate Fo of the cooling air detected by the discharge flowmeter 76. The first operation amount calculation part 114 calculates the first operation amount that is a feedback operation amount according to this deviation, and outputs the first command FCO1 indicating this operation amount.

When the command value of the flow rate adjuster command (reference valve command) is in the high-load flow rate region relative to the split point P, unless the second command generation section 121 is generating the second command FCO2, the intake valve command output unit 161 outputs the intake valve command FCO based on the first command FCO1 to the intake valve 69 (S5: intake valve command (flow rate adjuster command) output step). Upon receiving the intake valve command FCO, the intake valve 69 is set to a degree of opening according to the first command FCO1. On the other hand, when the command value of the flow rate adjuster command is in the high-load flow rate region relative to the split point P, regardless of whether the first command FCO1 is being generated or the second command FCO2 is being generated, the return valve command output unit 162 outputs a command indicating a degree of opening 0%, which is full closure, as the return valve command FrCO to the return valve 57 (S6: return valve command (flow rate adjuster command) output step). As a result, upon receiving the intake valve command FCO, the intake valve 69 is set to a degree of opening according to the first operation amount indicated by the first command FCO. Meanwhile, the return valve 57 is set to a degree of opening 0% under the return valve command FrCO. Thus, when the command value of the flow rate adjuster command is in the high-load flow rate region relative to the split point P, the intake valve 69 is so controlled that the cooling air flows through the discharge line 55 at the target flow rate Fst according to the operation state of the gas turbine 1. Accordingly, the cooling air is supplied to the combustion liner 22 at a flow rate appropriate for cooling the combustion liner 22.

When the command value of the flow rate adjuster command (reference valve command) is in the low-load flow rate region relative to the split point P, regardless of whether the first command FCO1 is being generated or the second command FCO2 is being generated, the intake valve command output unit 161 outputs a command indicating the minimum degree of opening SVmin (e.g., 20%) as the intake valve command FCO to the intake valve 69 (S5: intake valve command (flow rate adjuster command) output step). The degree of opening of the intake valve 69 is held constant at the minimum degree of opening SVmin under the intake valve command FCO. The minimum degree of opening SVmin is changed as appropriate according to the characteristics of the intake valve 69 etc. On the other hand, when the command value of the flow rate adjuster command is in the low-load flow rate region relative to the split point P, unless the second command generation section 121 is generating the second command FCO2, the return valve command output unit 162 outputs the return valve command FrCO based on the first command FCO1 to the return valve 57 (S6: return valve command (flow rate adjuster command) output step). Upon receiving the return valve command FrCO, the return valve 57 is set to a degree of opening according to the first operation amount indicated by the first command FCO1. The return valve command FrCO indicates an operation amount complementary to the first operation amount. Therefore, when the load Pw on the gas turbine 1 increases and the first operation amount increases, the operation amount (degree of opening) of the return valve 57 indicated by the return valve command FrCO decreases. Thus, when the command value of the flow rate adjuster command is in the low-load flow rate region relative to the split point P, the return valve 57 is so controlled that the flow rate of the cooling air flowing through the return line 56 decreases, and that the cooling air flows through the discharge line 55 at the target flow rate Fst according to the operation state of the gas turbine 1. Accordingly, the cooling air is supplied to the combustion liner 22 at a flow rate appropriate for cooling the combustion liner 22.

In the coolant valve command generation step (S4), the third command generation section 131 generates the third command. QCO3 for the coolant valve 66 (S4a: third command generation step). In the third command generation step (S4a), the temperature deviation computation part 133 of the third command generation section 131 obtains a deviation between the target temperature Tst according to the operation state of the gas turbine 1 and the temperature To of the cooling air detected by the discharge temperature indicator 74. The third operation amount calculation part 134 calculates the third operation amount that is a feedback operation amount according to this deviation, and outputs the third command QCO3 indicating this operation amount.

Unless the fourth command generation section 141 is generating the fourth command QCO4, the coolant valve command output unit 163 outputs the coolant valve command QCO based on the third command QCO3 to the coolant valve 66 (S7: coolant valve command (cooling amount adjuster command) output step). Upon receiving the coolant valve command QCO, the coolant valve 66 is set to a degree of opening according to the third operation amount, and the temperature To of the cooling air detected by the discharge temperature indicator 74 meets the target temperature Tst. Accordingly, the cooling air is supplied to the combustion liner 22 at a temperature appropriate for cooling the combustion liner 22.

When the load on the gas turbine 1 changes, the discharge pressure of the air compressor 10 changes. As a result, the intake air pressure of the booster 61 also changes as the discharge pressure of the air compressor 10 changes. On the other hand, due to the presence of the cooling air line 51, the discharge pressure of the booster 61 changes after a delay from the change in the discharge pressure of the air compressor 10. Thus, when the load on the gas turbine 1 changes, the pressure ratio in the booster 61 changes, so that the flow rate of the cooling air flowing through the booster 61 changes, and as a result, the flow rate of the cooling air supplied to the combustion liner 22 changes. That is, when the load on the gas turbine 1 changes, the flow rate of the cooling air transiently decreases according to this change. For this reason, when the load on the gas turbine 1 changes, the performance of the cooling air cooling the combustion liner 22 may decrease.

In this embodiment, therefore, when the load on the gas turbine 1 changes, the second command generation step (S3b) is performed in the flow rate adjuster command generation step (S3), and the fourth command generation step (S4b) is performed in the coolant valve command generation step (S4), to thereby increase the flow rate of cooling air supplied to the combustion liner 22 and to lower the temperature of this cooling air.

In the second command generation step (S3b) of the flow rate adjuster command generation step (S3), the second operation amount calculation part 122 of the second command generation section 121 of the flow rate adjuster command generation unit 110 calculates the second operation amount that is a feedforward target operation amount of the flow rate adjuster according to the operation state of the gas turbine 1. When the command first delay part 128 of the second command generation section 121 receives the change detection command LcsO from the load change determination unit 150, the command first delay part 128 outputs this change detection command LcsO to the second operation amount calculation part 122 after the first time T1. When the second operation amount calculation part 122 of the second command generation section 121 receives this change detection command. LcsO, the second operation amount calculation part 122 outputs the second command FCO2 indicating the second operation amount.

When the second command generation section 121 generates the second command FCO2, if the command value of the flow rate adjuster command (reference valve command) is in the high-load flow rate region relative to the split point P, the intake valve command output unit 161 gives priority to the second command FCO2 over the first command FCO1, and outputs the intake valve command FCO based on the second command FCO2 to the intake valve 69 (S5: intake valve command (flow rate adjuster command) output step). Upon receiving the intake valve command FCO, the intake valve 69 is set to a degree of opening according to the second operation amount. Specifically, when the command value of the flow rate adjuster command is in the high-load flow rate region relative to the split point P, the intake valve 69 is set to a degree of opening that allows the cooing air to flow through the discharge line 55 at the change-adapted flow rate higher than the target flow rate Fst, generated by the target flow rate generation part 112 of the first command generation section 111, by a predetermined percentage of the target flow rate Fst. On the other hand, as described above, when the command value of the flow rate adjuster command is in the high-load flow rate region relative to the split point P, regardless of whether the first command FCO1 is being generated or the second command FCO2 is being generated, the return valve command output unit 162 outputs a command indicating a degree of opening 0% as the return valve command FrCO to the return valve 57 (S6: return valve command (flow rate adjuster command) output step). Thus, during a load change with the command value of the flow rate adjuster command in the high-load flow rate region relative to the split point P, the intake valve 69 can be controlled so as to reduce the flow rate of the cooling air supplied to the combustion liner 22.

As described above, when the command value of the flow rate adjuster command (reference valve command) is in the low-load flow rate region relative to the split point P, regardless of whether the first command FCO1 is being generated or the second command FCO2 is being generated, the intake valve command output unit 161 outputs a command indicating the minimum degree of opening SVmin (e.g., 20%) as the intake valve command FCO to the intake valve 69 (S5: intake valve command (flow rate adjuster command) output step). The degree of opening of the intake valve 69 is held constant at the minimum degree of opening SVmin under the intake valve command FCO. On the other hand, when the command value of the flow rate adjuster command is in the low-load flow rate region relative to the split point P, if the second command generation section 121 generates the second command FCO2, the return valve command output unit 162 gives priority to the second command FCO2 over the first command FCO1, and outputs the return valve command FrCO based on the second command FCO2 to the return valve 57 (S6: return valve command (flow rate adjuster command) output step). Upon receiving the return valve command FrCO, the return valve 57 is set to a degree of opening according to the second operation amount. As described above, the return valve command FrCO indicates an operation amount complementary to the second operation amount. Therefore, when the load Pw on the gas turbine 1 increases and the second operation amount increases, the operation amount (degree of opening) of the return valve 57 indicated by the return valve command FrCO decreases. Specifically, when the command value of the flow rate adjuster command is in the low-load flow rate region relative to the split point P, the return valve 57 is set to a degree of opening that allows the cooling air to flow through the discharge line 55 at the change-adapted flow rate higher than the target flow rate Fst, generated by the target flow rate generation part 112 of the first command generation section 111, by a predetermined percentage of the target flow rate Fst. Thus, during a load change with the command value of the flow rate adjuster command in the low-load flow rate region relative to the split point P, the return valve 57 can be so controlled that the flow rate of the cooling air flowing through the return line 56 decreases, and that the required flow rate of the cooling air supplied to the combustion liner 22 is maintained.

When the command second delay part 129 of the second command generation section 121 receives the change end command LceO from the load change determination unit 150, the command second delay part 129 outputs this change end command LceO to the second operation amount calculation part 122 after the second time T2. When the second operation amount calculation part 122 of the second command generation section 122 receives the change end command LceO, the second operation amount calculation part 122 stops outputting the second command FCO2 indicating the second operation amount.

When the second command generation section 121 stops generating the second command FCO2, if the command value of the flow rate adjuster command is in the high-load flow rate region relative to the split point P, the intake valve command output unit 161 outputs the intake valve command FCO based on the first command FCO1 to the intake valve 69 (S5: intake valve (flow rate adjuster command) command output step). As described above, upon receiving the intake valve command FCO, the intake valve 69 is set to a degree of opening according to the first operation amount. As a result, the cooling air flows through the discharge line 55 at the target flow rate Fst according to the operation state of the gas turbine 1. When the command value of the flow rate adjuster command is in the high-load flow rate region relative to the split point P, the degree of opening of the return valve 57 is constant at 0% (full closure).

When the second command generation section 121 stops generating the second command FCO2, if the command value of the flow rate adjuster command is in the low-load flow rate region relative to the split point P, the return valve command output unit 162 outputs the return valve command FrCO based on the first command FCO1 to the return valve 57 (S6: return valve command (flow rate adjuster command) output step). When the return valve command FrCO is output; the degree of opening of the return valve 57 is controlled to a degree of opening according to the first operation amount so that the cooling air flows through the discharge line 55 at the target flow rate Fst according to the operation state of the gas turbine 1. When the command value of the flow rate adjuster command is in the low-load flow rate region relative to the split point P, the degree of opening of the intake valve 69 is constant at the minimum degree of opening SVmin (e.g., 20%).

In the fourth command generation step (S4b) of the coolant valve command generation step (S4), the fourth operation amount calculation part 142 of the fourth command generation section 141 of the coolant valve command generation unit 130 calculates the fourth operation amount that is a feedforward target operation amount of the coolant valve 66 according to the operation state of the gas turbine 1. When the command third delay part 148 of the fourth command generation section 141 receives the change detection command LcsO from the load change determination unit 150, the command third delay part 148 outputs this change detection command LcsO to the fourth operation amount calculation part 142 after the first time T1. When the fourth operation amount calculation part 142 of the fourth command generation section 141 receives the change detection command LcsO, the fourth operation amount calculation part 142 outputs the fourth command QCO4 indicating the fourth operation amount.

When the fourth command generation section 141 generates the fourth command QCO4, the coolant valve command output unit 163 gives priority to the fourth command QCO4 over the third command QCO3, and outputs the coolant valve command QCO based on the fourth command QCO4 to the coolant valve 66 (S7: coolant valve command (cooling amount adjuster command) output step). Upon receiving the coolant valve command QCO, the coolant valve 66 is set to a degree of opening according to the fourth operation amount. Specifically, the coolant valve 66 is set to a degree of opening that allows the cooling air to meet the change-adapted temperature lower than the target temperature Tst, generated by the target temperature generation part 132 of the third command generation section 131, by a predetermined percentage of the target temperature Tst. Accordingly, during a load change, the temperature of the cooling air supplied to the combustion liner 22 decreases.

When the command fourth delay part 149 of the fourth command generation section 141 receives the change end command LceO from the load change determination unit 150, the command fourth delay part 149 outputs this change end command LceO to the fourth operation amount calculation part 142 after the third time T3. When the fourth operation amount calculation part 142 of the fourth command generation section 141 receives the change end command LceO, the fourth operation amount calculation part 142 stops outputting the fourth command QCO4 indicating the fourth operation amount.

When the fourth command generation section 141 stops generating the fourth command QCO4, the coolant valve command QCO based on the third command QCO3 is output to the coolant valve 66 (S7: coolant valve command (cooling amount adjuster command) output step). As described above, upon receiving the coolant valve command QCO, the coolant valve 66 is set to a degree of opening according to the third operation amount, and the temperature of the cooling air detected by the discharge temperature indicator 74 meets the target temperature Tst.

Figure 4:
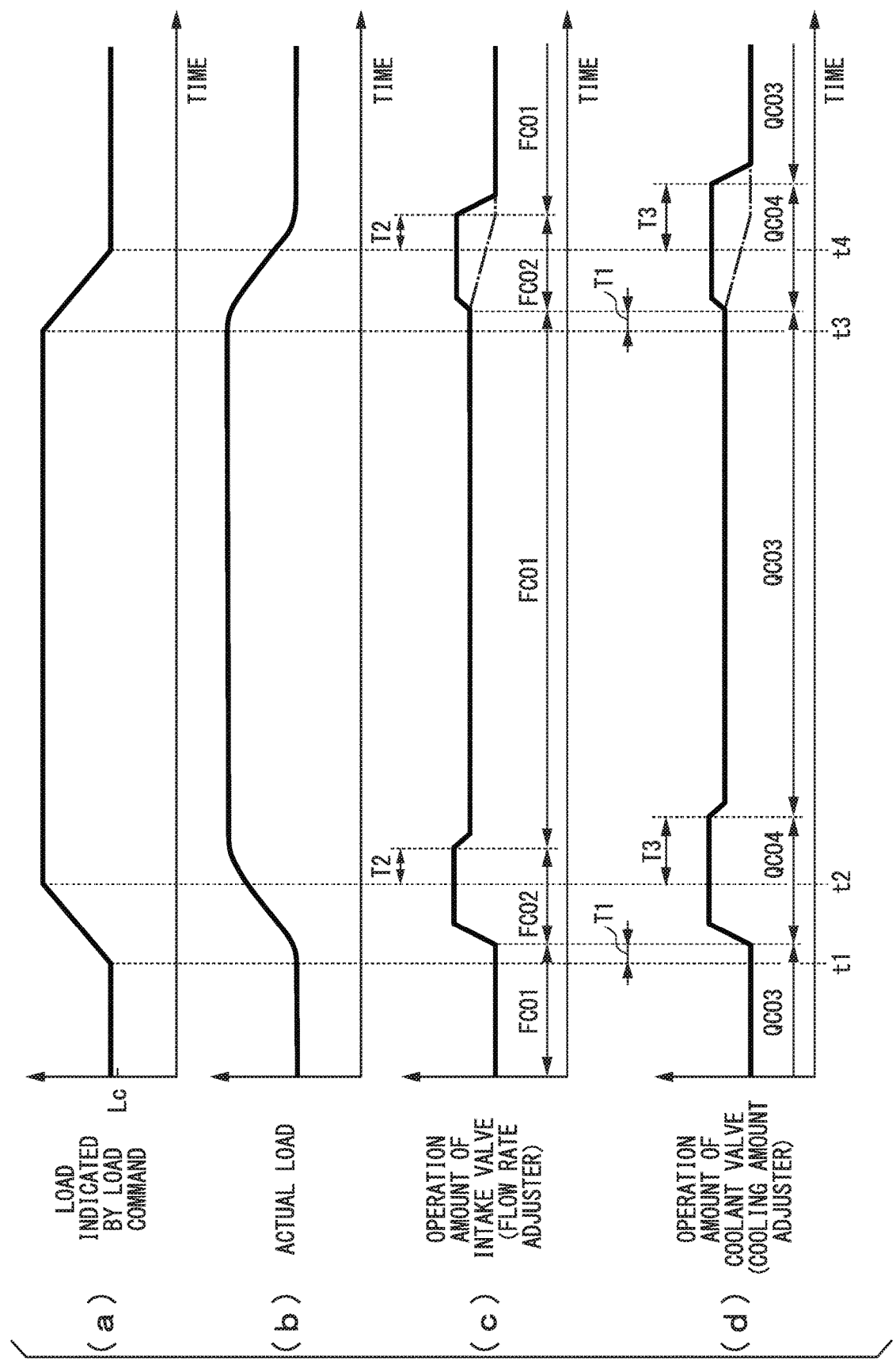
FIG. 4 is a timing chart showing operations of each part etc. in a high-load flow rate region in the gas turbine facility in the first embodiment according to the present invention, in which FIG. 4($a$) shows changes in a load indicated by a load command.

Next, the operations of the intake valve (flow rate adjuster) 69, the return valve 57 (flow rate adjuster), and the coolant valve (cooling amount adjuster) 66 during a load change with the command value of the flow rate adjuster command (reference valve command) in the high-load flow rate region relative to the split point P will be described in accordance with the timing chart shown in FIG. 4.

As shown in FIG. 4(a), it is assumed that, when the load indicated by the load command LO is not smaller than a switching load Lc, the load indicated by the load command LO starts increasing at time t1. As shown in FIG. 4(b), the actual load that is the load on the gas turbine 1 detected by the output meter 78 starts increasing after some delay from the start of increase (t1) in the load indicated by the load command LO.

When the load indicated by the load command. LO is not smaller than the switching load Lc, the command value of the flow rate adjuster command is in the high-load flow rate region relative to the split point P. In this case, the degree of opening of the return valve 57 is constant at 0% (full closure).

As shown in FIG. 4(c), the second command generation section 121 of the flow rate adjuster command generation unit 110 generates the second command FCO2 Ether the first time T1 from the start of increase (t1) in the load indicated by the load command LO. The intake valve command output unit 161 outputs the intake valve command FCO based on the second command FCO2 to the intake valve 69. As a result, the intake valve 69 is set to a degree of opening that is in accordance with the second operation amount indicated by the second command FCO2 and larger than the degree of opening up to that point. Specifically, as described above, the intake valve 69 is set to a degree of opening that allows the cooling air to flow through the discharge line 55 at the change-adapted flow rate higher than the target flow rate Fst, generated by the target flow rate generation part 112 of the first command generation section 111, by a predetermined percentage of the target flow rate Fst.

As shown in FIG. 4(d), the fourth command generation section 141 of the coolant valve command generation unit 130 generates the fourth command QCO4 after the first time T1 from the start of increase (t1) in the load indicated by the load command LO. The coolant valve command output unit 163 outputs the coolant valve command QCO based on the fourth command QCO4 to the coolant valve 66. As a result, the coolant valve 66 is set to a degree of opening according to the fourth operation amount indicated by the fourth command QCO4. Specifically, as described above, the coolant valve 66 is set to a degree of opening that allows the cooling air to meet the change-adapted temperature lower than the target temperature Tst, generated by the target temperature generation part 132 of the third command generation section 131, by a predetermined percentage of the target temperature Tst.

There is a time delay between when the load indicated by the load command LO starts changing and when the discharge pressure of the air compressor 10 changes. In this embodiment, therefore, so that the operation amounts of the intake valve 69 and the coolant valve 66 change at the same time as the discharge pressure of the air compressor 10 changes, the intake valve command FCO based on the second command FCO2 is output to the intake valve 69 and the coolant valve command QCO based on the fourth command QCO4 is output to the coolant valve 66, after the first time T1 from the start of change (t1) in the load indicated by the load change LO.

The load change determination unit 150 recognizes a change in the load indicated by the load command LO after some time has elapsed from the load change, and outputs the change detection command LcsO etc. after thus recognizing the load change. The time from when the load indicated by the load command LO changes until when the load change determination unit 150 recognizes this load change is shorter than the first time T1. Therefore, the time at which the load indicated by the load command LO changes and the time at which the load change determination unit 150 recognizes this load change will be regarded as the same time here.

As shown in FIG. 4(a), it is assumed that the load indicated by the load command LO stops increasing at time t2. As shown in FIG. 4(b), the actual load on the gas turbine 1 stops increasing after some delay from the end of increase (t2) in the load indicated by the load command LO.

As shown in FIG. 4(c), the second command generation section 121 of the flow rate adjuster command generation unit 110 stops generating the second command FCO2 after the second time T2 from the end of increase (t2) in the load indicated by the load command LO. The intake vale command output unit 161 outputs the intake valve command FCO based on the first command FCO1 being generated by the first command generation section 111 to the intake valve 69. As a result, the intake valve 69 is set to a degree of opening that is in accordance with the first operation amount indicated by the first command FCO1 and smaller than the degree of opening up to that point. Specifically, as described above, the intake valve 69 is set to a degree of opening that allows the cooling air to flow through the discharge line 55 at the target flow rate Fst generated by the target flow rate generation part 112 of the first command generation section 111.

As shown in FIG. 4(d), the fourth command generation section 141 of the coolant valve command generation unit 130 stops generating the fourth command QCO4 after the third time T3 from the end of increase (t2) in the load indicated by the load command LO. The coolant vale command output unit 163 outputs the coolant valve command QCO based on the third command QCO3 being generated by the third command generation section 131 to the intake valve 69. As a result, the coolant valve 66 is set to a degree of opening according to the third operation amount indicated by the third command QCO3. Specifically, as described above, the coolant valve 66 is set to a degree of opening that allows the cooling air to flow at the target temperature Tst generated by the target temperature generation part 132 of the third command generation section 131.

There is a time delay between when the load indicated by the load command LO stops changing and when the discharge pressure of the air compressor 10 stops changing. In this embodiment, therefore, so that the operation amounts of the intake valve 69 and the coolant valve 66 change after the discharge pressure of the air compressor 10 changes, the intake valve command FCO based on the second command FCO2 is output to the intake valve 69 after the second time T2 from the start of change in the load indicated by the load command LO, and the coolant valve command QCO based on the fourth command QCO4 is output to the coolant valve 66 after the third time T3 from the start of change in the load indicated by the load command LO.

As shown in FIG. 4(a), it is assumed that the load indicated by the load command LO starts decreasing at time t3. As shown in FIG. 4(b), the actual load that is the load on the gas turbine 1 detected by the output meter 78 starts decreasing after some delay from the start of decrease (t3) in the load indicated by the load command LO.

As shown in FIG. 4(c), the second command generation section 121 of the flow rate adjuster command generation unit 110 generates the second command FCO2 after the first time T1 from the start of decrease (t3) in the load indicated by the load command LO. The intake valve command output unit 161 outputs the intake valve command FCC) based on the second command FCO2 to the intake valve 69. As a result, the intake valve 69 is set to a degree of opening that is in accordance with the second operation amount indicated by the second command FCO2 and larger than the degree of opening up to that point according to the first operation amount.

As shown in FIG. 4(d), the fourth command generation section 141 of the coolant valve command generation unit 130 generates the fourth command QCO4 after the first time T1 from the start of decrease (t3) in the load indicated by the load command LO. The coolant valve command output unit 163 outputs the coolant valve command QCO based on the fourth command QCO4 to the coolant valve 66. As a result, the coolant valve 66 is set to a degree of opening according to the fourth operation amount indicated by the fourth command QCO4.

As shown in FIG. 4(a), it is assumed that the load indicated by the load command LO stops decreasing at time t4. As shown in FIG. 4(b), the actual load on the gas turbine 1 stops decreasing after some delay from the end of decrease (t4) in the load indicated by the load command LO.

As shown in FIG. 4(c), the second command generation section 121 of the flow rate adjuster command generation unit 110 stops generating the second command FCO2 after the second time T2 from the end of decrease (t4) in the load indicated by the load command LO. The intake valve command output unit 161 outputs the intake valve command FCO based on the first command FCO1 being generated by the first command generation section 111 to the intake valve 69. As a result, the intake valve 69 is set to a degree of opening that is in accordance with the first operation amount indicated by the first command FCO1 and smaller than the degree of opening up to that point according to the second operation amount.

As shown in FIG. 4(d), the fourth command generation section 141 of the coolant valve command generation unit 130 stops generating the fourth command QCO4 after the third time T3 from the end of decrease (t4) in the load indicated by the load command LO. The coolant valve command output unit 163 outputs the coolant valve command QCO based on the third command QCO3 being generated by the third command generation section 131 to the coolant vale 66. As a result, the coolant vale 66 is set to a degree of opening according to the third operation amount indicated by the third command QCO3.

Figure 5:
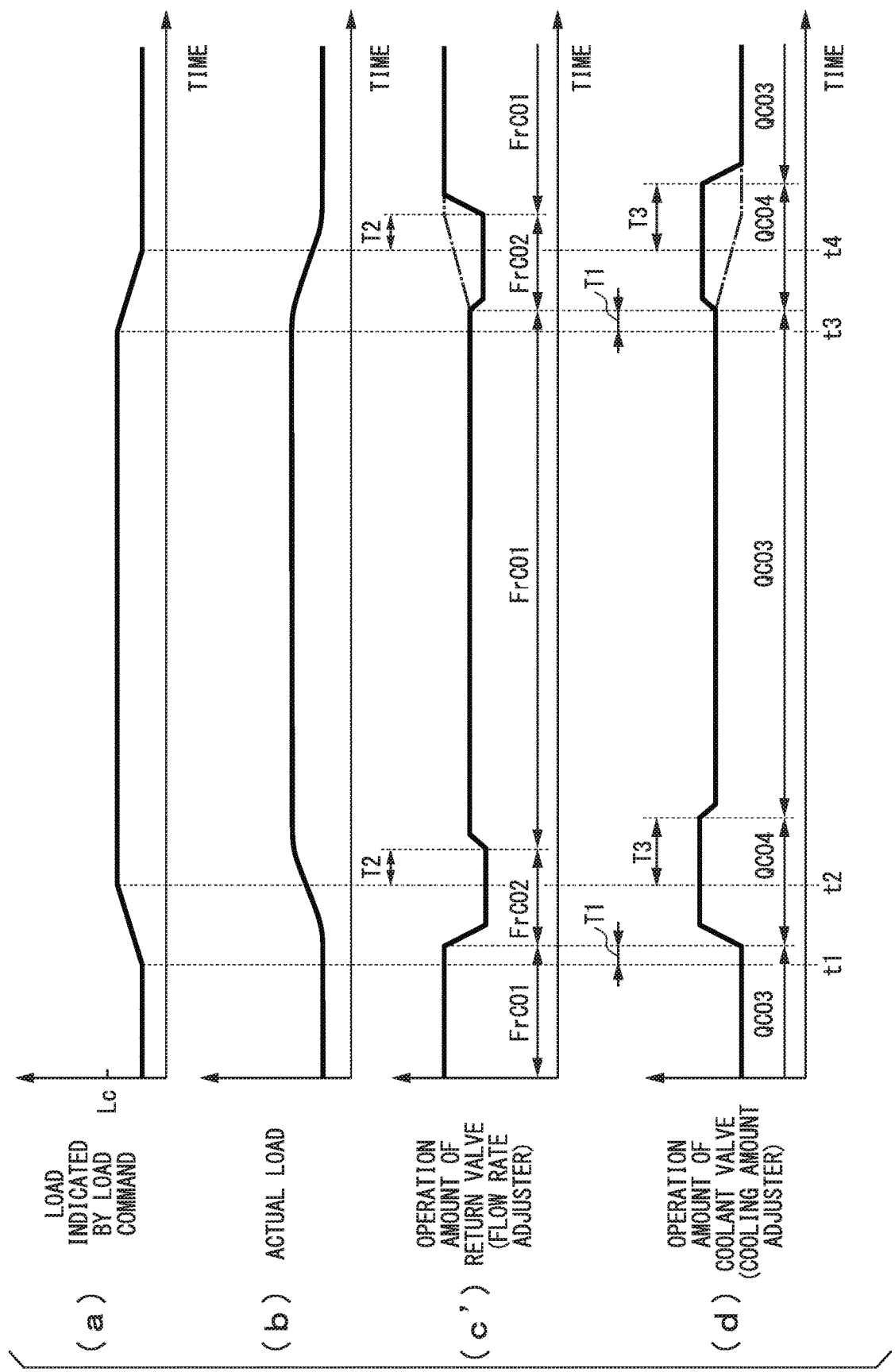
FIG. 5 is a timing chart showing operations of each part etc. in a low-load flow rate region in the gas turbine facility in the first embodiment according to the present invention, in which FIG. 5($a$) shows changes in the load indicated by the load command.

Next, operations of the intake valve (flow rate adjuster) 69, the return valve 57 (flow rate adjuster), and the coolant valve (cooling amount adjuster) 66 during a load change with the command value of the flow rate adjuster command (reference valve command) in the low-load flow rate region relative to the split point P will be described in accordance with the timing chart shown in FIG. 5.

As shown in FIG. 5(a), it is assumed that, when the load indicated by the load command LO is smaller than the switching load Lc, the load indicated by the load command LO starts increasing at time t1. As shown in FIG. 5(b), the actual load that is the load on the gas turbine 1 detected by the output meter 78 starts increasing after some delay from the start of increase (t1) in the load indicated by the load command LO.

When the load indicated by the load command LO is smaller than the switching load Lc, the command value of the flow rate adjuster command is in the low-load flow rate region relative to the split point P. In this case, the degree of opening of the intake valve 69 is constant at the minimum degree of opening SVmin (e.g., 20%). The operations of the coolant valve command generation unit 130 and the coolant valve command output unit 163 when the command value of the flow rate adjuster command is in the high-load flow rate region relative to the split point P are the same as the operations thereof when the command value of the flow rate adjuster command is in the low-load flow rate region relative to the split point P. Therefore, the operations of the coolant valve command generation unit 130 and the coolant valve command output unit 163 when the load indicated by the load command LO is smaller than the switching load Lc, i.e., when the command value of the flow rate adjuster command is in the low-load flow rate region relative to the split point P, will be omitted from the following description.

The second command generation section 121 of the flow rate adjuster command generation unit 110 generates the second command FCO2 after the first time T1 from the start of increase (t1) in the load indicated by the load command LO. As shown in FIG. 5(c'), the return valve command output unit 162 outputs the return valve command FrCO2 based on the second command FCO2 to the return valve 57. When the load indicated by the load command LO increases, the operation amount indicated by the first command FCO1 also increases. Moreover, the operation amount indicated by the second command FCO2 represents a value larger than the operation amount indicated by the first command FCO1. The operation amount FrCO2 of the return valve 57 indicated by the return valve command FrCO2 is an operation amount complementary to the operation amount indicated by the flow rate adjuster command (the first command or the second command). Therefore, when the operation amount indicated by the flow rate adjuster command (the first command or the second command) increases, the operation amount (degree of opening) of the return valve 57 indicated by the return valve command FrCO2 conversely decreases. As a result, the degree of opening of the return valve 57 becomes smaller than the degree of opening up to that point, by an amount equal to or larger than an amount corresponding to the increase in the operation (the increase in the operation amount indicated by the first command). Specifically, the return valve 57 is set to a degree of opening that allows the cooling air to flow through the discharge line 55 at the change-adapted flow rate higher than the target flow rate Fst, generated by the target flow rate generation part 112 of the first command generation section 111, by a predetermined percentage of the target flow rate Fst.

As shown in FIG. 5(a), it is assumed that the load indicated by the load command LO stops increasing at time t2. As shown in FIG. 5(b), the actual load on the gas turbine 1 stops increasing after some delay from the end of increase (t2) in the load indicated by the load command LO.

The second command generation section 121 of the flow rate adjuster command generation unit 110 stops generating the second command FCO2 after the second time T2 from the end of increase (t2) in the load indicated by the load command LO. As shown in FIG. 5(c'), the return valve command output unit 162 outputs the return valve command FrCO1 based on the first command FCO1 being generated by the first command generation section 111 to the return valve 57. The operation amount indicated by the first command FCO1 is smaller than the operation amount indicated by the second command FCO2. Moreover, as described above, the operation amount FrCO1 of the return valve 57 indicated by the return valve command FrCO1 is an operation amount complementary to the operation amount indicated by the flow rate adjuster command (the first command or the second command).

Accordingly, the operation amount indicated by the return valve command FrCO1 based on the first command FCO1 is conversely smaller than the return valve command FrCO2 based on the second command FCO2. As a result, the return valve 57 is set to a degree of opening larger than the degree of opening up to that point. Specifically, the return valve 57 is set to a degree of opening that allows the cooling air to flow through the discharge line 55 at the target flow rate Fst generated by the target flow rate generation part 112 of the first command generation section 111.

As shown in FIG. 5(a), it is assumed that the load indicated by the load command LO starts decreasing at time t3. As shown in FIG. 5(b), the actual load that is the load on the gas turbine 1 detected by the output meter 78 starts decreasing after some delay from the start of decrease (t3) in the load indicated by the load command LO.

The second command generation section 121 of the flow rate adjuster command generation unit 110 generates the second command FCO2 after the first time T1 from the start of decrease (t3) in the load indicated by the load command LO. As shown in FIG. 5(c'), the return valve command output unit 162 outputs the return valve command FrCO2 based on the second command FCO2 to the return valve 57. The operation amount indicated by the second command FCO2 is larger than the operation amount indicated by the first command FCO1. Moreover, as described above, the operation amount FrCO2 of the return valve 57 indicated by the return valve command FrCO2 is an operation amount complementary to the operation amount indicated by the flow rate adjuster command (the first command or the second command). Therefore, when the operation amount indicated by the flow rate adjuster command (the first command or the second command) increases, the operation amount (degree of opening) of the return valve 57 indicated by the return valve command FrCO2 conversely decreases. As a result, the degree of opening of the return valve 57 becomes smaller than the degree of opening up to that point. Specifically, the return valve 57 is set to a degree of opening that allows the cooling air to flow through the discharge line 55 at the change-adapted flow rate higher than the target flow rate Fst, generated by the target flow rate generation part 112 of the first command generation section 111, by a predetermined percentage of the target flow rate Fst.

As shown in FIG. 5(a), it is assumed that the load indicated by the load command LO stops decreasing at time t4. As shown in FIG. 5(b), the actual load on the gas turbine 1 stops decreasing after some delay from the end of decrease (t4) in the load indicated by the load command LO.

The second command generation section 121 of the flow rate adjuster command generation unit 110 stops generating the second command FCO2 after the second time T2 from the end of decrease (t4) in the load indicated by the load command LO. As shown in FIG. 5(c'), the return valve command output unit 162 outputs the return valve command FrCO1 based on the first command FCO1 being generated by the first command generation section 111 to the return valve 57 As a result, the degree of opening of the return valve 57 becomes larger than the degree of opening up to that point. Specifically, the return valve 57 is set to a degree of opening that allows the cooling air to flow through the discharge line 55 at the target flow rate Fst generated by the target flow rate generation part 112 of the first command generation section 111.

As has been described above, in this embodiment, sufficient cooling air required to cool the combustion liner 22 that is the hot part can be supplied even during a load change. In this embodiment, therefore, when the load is stable, the cooling air does not need to be supplied to the combustion liner 22 at a higher flow rate so as to allow for a load change. Thus, this embodiment makes it possible to sufficiently cool the hot parts even during a load change while reducing the amount of cooling air used when the load is stable.

In this embodiment, the second operation amount calculation part 122 calculates the second operation amount that is a feedforward target operation amount of the flow rate adjuster according to the operation state of the gas turbine 1, and the fourth operation amount calculation part 142 calculates the fourth operation amount that is a feedforward target operation amount of the coolant valve 66 according to the operation state of the gas turbine 1. Alternatively, the second operation amount and the fourth operation amount may be fixed values. Specifically, the second operation amount of the flow rate adjuster may be any operation amount that allows the change-adapted flow rate to be met that is higher than the target flow rate Fst generated by the target flow rate generation part 112 of the first command generation section 111; for example, the second operation amount may be an operation amount indicating a degree of opening of the intake valve 69 that is full opening, or an operation amount indicating a degree of opening 90% of the intake valve 69. The fourth operation amount of the coolant valve 66 may be any operation amount that allows the cooling air to meet a temperature lower than the target temperature Tst generated by the target temperature generation part 132 of the third command generation section 131; for example, the fourth operation amount may be an operation amount indicating a degree of opening of the coolant valve 66 that is full opening, or an operation amount indicating a degree of opening 90% of the coolant valve 66.

In this embodiment, the second operation amount is adopted as the operation amount of the flow rate adjuster during a load increase and a load decrease that are forms of load change. However, during a load decrease, the first operation amount, instead of the second operation amount, may be adopted as the operation amount of the flow rate adjuster. In other words, even when the load decreases, the first operation amount may be maintained as the operation amount of the flow rate adjuster. Moreover, in this embodiment, the fourth operation amount is adopted as the operation amount of the coolant valve 66 during a load increase and a load decrease. However, during a load decrease, the third operation amount, instead of the fourth operation amount, may be adopted as the operation amount of the coolant valve 66. In other words, even when the load decreases, the third operation amount may be maintained as the operation amount of the coolant valve 66. In these cases, as indicated by the two-dot dashed line in FIG. 4(c), during a load decrease, the operation amount (degree of opening) of the intake valve 69 decreases due to the first operation amount decreasing as the load decreases. As indicated by the two-dot dashed line in FIG. 4(d), during a load decrease, the operation amount (degree of opening) of the coolant valve 66 decreases due to the third operation amount decreasing as the load decreases. As indicated by the two-dot dashed line in FIG. 5(c'), during a load decrease, the operation amount (degree of opening) of the return valve 57 increases due to the first operation amount decreasing as the load decreases.

Second Embodiment

Figure 7:
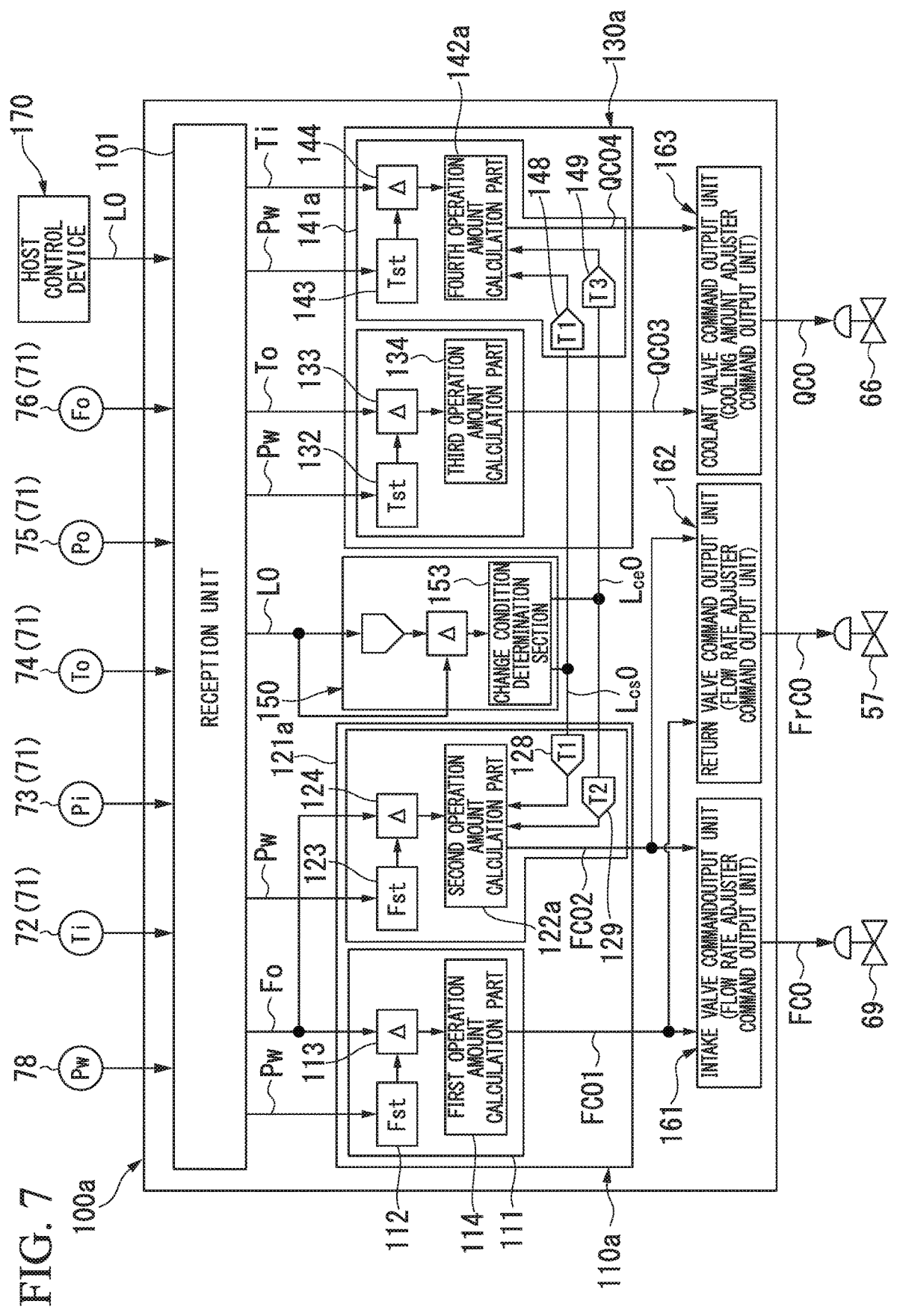

A second embodiment of the gas turbine facility will be described in detail with reference to FIG. 7.

The gas turbine facility of this embodiment is the same as the gas turbine facility of the above embodiment, except that the configuration of a control device 100a is different from the configuration of the control device 100 in the above embodiment. Therefore, the control device 100a of this embodiment will be described below.

Like the control device 100 of the first embodiment, the control device 100a of this embodiment has the reception unit 101, the load change determination unit 150, a flow rate adjuster command generation unit 110a, a coolant valve command generation unit 130a, the intake valve command output unit 161, and the coolant valve command output unit 163. Like the flow rate adjuster command generation unit 110 of the first embodiment, the flow rate adjuster command generation unit 110a has the first command generation section 111 and a second command generation section 121a. Like the coolant valve command generation unit 130 of the first embodiment, the coolant valve command generation unit 130a has the third command generation section 131 and a fourth command generation section 141a.

Like the second command generation section 121 of the first embodiment, the second command generation section 121a of this embodiment has a second operation amount calculation part 122a, the command first delay part 128, and the command second delay part 129. The second command generation section 121a of this embodiment further has a target flow rate generation part 123 and a flow rate deviation computation part 124. Like the target flow rate generation part 112 of the first command generation section 111, the second command generation section 121a of this embodiment generates a target flow rate of the cooling air flowing through the discharge line 55 according to the operation state of the gas turbine 1. However, a target flow rate Fct generated by the target flow rate generation part 123 of the second command generation section 121a in this embodiment is a flow rate that is higher than the target flow rate Fst, generated by the target flow rate generation part 112 of the first command generation section 111, by a predetermined percentage of the target flow rate Fst. The flow rate deviation computation part 124 calculates a deviation between the flow rate Fo of the cooling air detected by the discharge flowmeter 76 and the target flow rate Fct. The second operation amount calculation part 122a calculates the second operation amount that is a feedback operation amount according to this deviation. When the second operation amount calculation part 122a receives the change detection command LcsO from the command first delay part 128, the second operation amount calculation part 122a outputs the second command FCO2 indicating the second operation amount. When the second operation amount calculation part 122a receives the change end command LceO from the command second delay part 129, the second operation amount calculation part 122a stops outputting the second command FCO2.

Thus, the second command generation section 121a of this embodiment generates a command indicating a feedback operation amount like the first command FCO1 generated by the first command generation section 111.

Like the fourth command generation section 141 of the first embodiment, the fourth command generation section 141a of this embodiment has a fourth operation amount calculation part 142a, the command third delay part 148, and the command fourth delay part 149. The fourth command generation section 141a of this embodiment further has a target temperature generation part 143 and a temperature deviation computation part 144. Like the target temperature generation part 132 of the third command generation section 131, the fourth command generation section 141a of this embodiment generates a target temperature of the cooling air according to the operation state of the gas turbine 1. However, a target temperature Tct generated by the target temperature generation part 143 of the fourth command generation section 141a is a temperature that is lower than the target temperature Tst, generated by the target temperature generation part 132 of the third command generation section 131, by a predetermined percentage of the target temperature Tst. The temperature deviation computation part 144 calculates a deviation between the temperature T1 of the cooling air detected by the intake air temperature indicator 72 and the target temperature Tct. The fourth operation amount calculation part 142a calculates a fourth operation amount that is a feedback operation amount according to this deviation. When the fourth operation amount calculation part 142a receives the change detection command LcsO from the command third delay part 148, the fourth operation amount calculation part 142a outputs the second command FCO2 indicating the fourth operation amount. When the fourth operation amount calculation part 142a receives the change end command LceO from the command fourth delay part 149, the fourth operation amount calculation part 142a stops outputting the fourth command QCO4.

Thus, the fourth command generation section 141a of this embodiment generates a command indicating a feedback operation amount like the third command QCO3 generated by the third command generation section 131.

In this embodiment, too, during a load change, the intake valve 69 and the return valve 57 are each set to a degree of opening that allows the cooling air to flow through the discharge line 55 at the change-adapted flow rate higher than the target flow rate Fst generated by the target flow rate generation part 112 of the first command generation section 111. During a load change, the coolant valve 66 is set to a degree of opening that allows the cooling air to meet the change-adapted temperature lower than the target temperature Tst generated by the target temperature generation part 132 of the third command generation section 131.

Thus, like the first embodiment, this embodiment also makes it possible to sufficiently cool the hot parts even during a load change while reducing the amount of cooling air used when the load is stable.

The fourth command generation section 141a of this embodiment calculates the feedback operation amount according to the deviation between the temperature Ti of the cooling air detected by the intake air temperature indicator 72 and the target temperature. Alternatively, like the third command generation section 131, the fourth command generation section 141a may calculate a feedback operation amount according to the deviation between the temperature To of the cooling air detected by the discharge temperature indicator 74 and the target temperature. However, the temperature Ti of the cooling air detected by the intake air temperature indicator 72 has higher responsiveness to a temperature change of the cooling air flowing out of the cooler 64, than the temperature To of the cooling air detected by the discharge temperature indicator 74. Therefore, to obtain a feedback operation amount of the cooling amount adjuster during a load change, the temperature Ti of the cooling air detected by the intake air temperature indicator 72 is preferably used as in this embodiment.

First Modified Example

Figure 8:
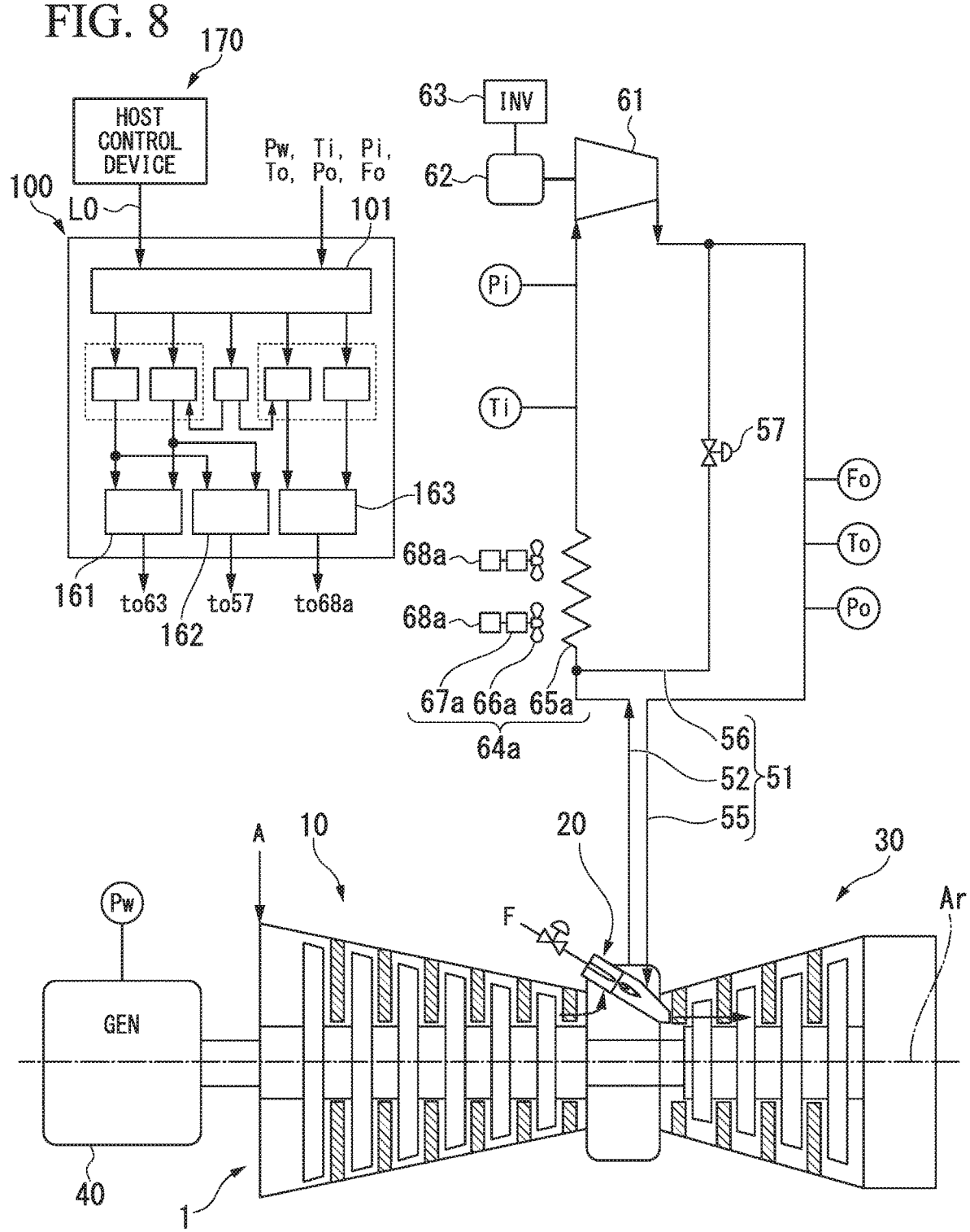
FIG. 8 is a system diagram of a gas turbine facility in a first modified example of the embodiments according to the present invention.

A first modified example of the gas turbine facility in the first embodiment and the second embodiment will be described with reference to FIG. 8.

The flow rate adjusters of the gas turbine facility in the first embodiment and the second embodiment are the intake valve 69 and the return valve 57. On the other hand, the flow rate adjusters in this modified example are the return valve 57 and an inverter 63 that changes the rotation speed of a motor 62 of the booster 61. The flow rate adjuster command output unit 161 of the control device 100 outputs a command to the inverter 63, while the flow rate adjuster command output unit 162 outputs a command to the return valve 57 as in the above embodiments.

The cooler 64 of the gas turbine facility in the first embodiment and the second embodiment is a heat exchanger. On the other hand, a cooler 64a of this modified example has a radiator 65a through the inside of which compressed air flows, a fan 66a that blows air onto the outside of the radiator 65a, and a motor 67a that drives the fan 66a. The cooling amount adjuster of this embodiment is an inverter (driving amount adjuster) 68a that changes the rotation speed of the motor 67a of the fan 66a. The cooling amount adjuster command output unit 163 of the control device 100 outputs a command to the inverter 68a.

Changing the rotation speed of the motor 62 of the booster 61 can change the flow rate of cooling air supplied to the hot parts. Moreover, changing the rotation speed of the motor 67a of the fan 66a can change the temperature of the cooling air. Thus, this modified example can produce the same effects as the above embodiments.

Second Modified Example

Figure 9:
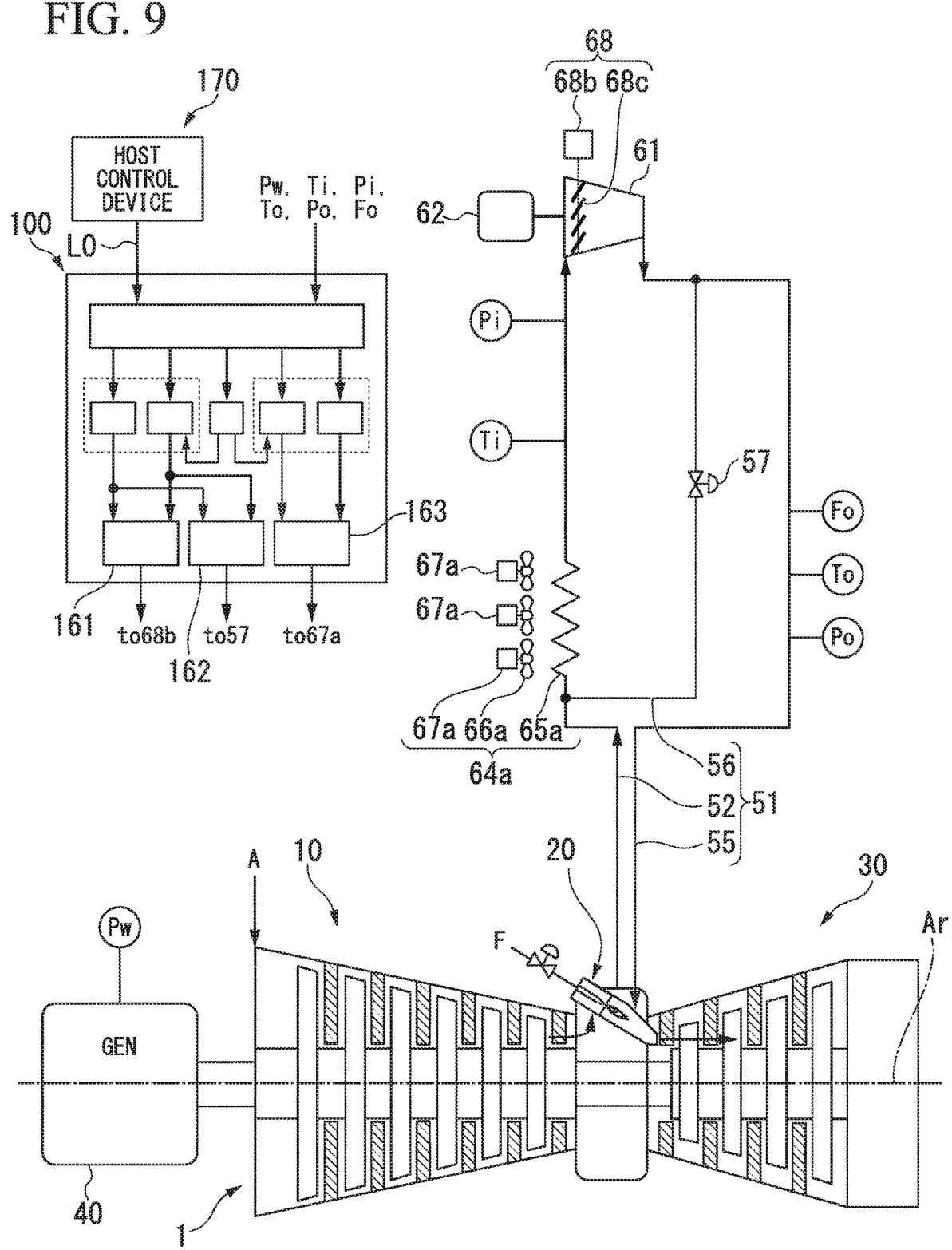
FIG. 9 is a system diagram of a gas turbine facility in a second modified example of the embodiments according to the present invention.

A second modified example of the gas turbine facility in the first embodiment and the second embodiment will be described with reference to FIG. 9.

The flow rate adjusters of the gas turbine facility in the first embodiment and the second embodiment are the intake valve 69 and the return valve 57. On the other hand, the flow rate adjusters in this modified example are the return valve 57 and an inlet guide vane (hereinafter referred to as the IGV) 68 that changes the flow rate of the cooling air flowing into a casing of the booster 61. The IGV 68 has a variable vane 68c that is disposed on a suction port side inside the casing of the booster 61, and a vane driving device 68h that changes the angle of the variable vane 68c. The flow rate adjuster command output unit 161 of the control device 100 outputs a command to the vane driving device 68b of the IGV 68. The flow rate adjuster command output unit 162 outputs a command to the return valve 57 as in the above embodiment.

The cooler 64 of the gas turbine facility in the first embodiment and the second embodiment is a heat exchanger. On the other hand, a cooler 64a of this modified example has a radiator 65a through the inside of which compressed air flows, a plurality of fans 66a that blow air onto the outside of the radiator 65a, and motors 67a that are provided respectively for the plurality of fans 66a. The cooling amount adjuster of this embodiment is the motor (driving amount adjuster) 67a that is provided for each of the plurality of fans 66a. The cooling amount adjuster command output unit 163 of the control device 100 outputs a command to the plurality of motors.

Changing the angle of the variable vane 68c of the IGV 68 of the booster 61 can change the flow rate of the cooling air supplied to the hot parts. Moreover, changing the number of the operating motors 67a provided respectively for the plurality of fans 66a can change the temperature of the cooling air. Thus, this modified example can produce the same effects as the above embodiments.

Any combination of the aspects of the flow rate adjuster shown in the first embodiment, the first modified example, and this modified example, and the aspects of the cooling amount adjuster shown in the first embodiment, the first modified example, and this modified example may be adopted.

Other Modified Examples

The control device 100 or 100a and the host control device 170 are separate in the above embodiments, but these devices may be integrated.

In the above embodiments, the third operation amount related to the coolant valve (cooling amount adjuster) 66 is a variable value that changes according to the operation state of the gas turbine 1, but this third operation amount may instead be a fixed value. In this case, the temperature of the cooling air changes, for example, according to a change in the flow rate of the compressed air passing through the cooler 64. The temperature of this cooling air is regarded as the target temperature in relation with the change-adapted temperature. Also in this case, the change-adapted temperature that is realized as the operation amount of the coolant valve (cooling amount adjuster) 66 is set to the fourth operation amount is set to be lower than the target temperature. Accordingly, also when the third operation amount is a fixed value, the fourth Operation amount is larger than the third operation amount and the cooling temperature during a load change decreases as in the above embodiments.

In the above embodiments, the flow rate adjuster command generation units 110, 110a generate a command for the intake valve and a command for the return valve. However, a command generation unit for the intake valve and a command generation unit for the return valve may be separately provided.

To respond to a load change, the control devices 100, 100a in the above embodiments and the modified examples have the second command generation sections 121, 121a and the fourth command generation sections 141, 141a. Alternatively, the control device may have only either the second command generation section or the fourth command generation section.

The cooling system 50 in the above embodiments and the modified examples sends the cooling air to the combustion liner 22 as the hot part. However, the cooling system 50 may also send the cooling air to any hot parts other than the combustion liner 22. For example, the cooling system 50 may send the cooling air to the blades 35 or the vanes 39 of the turbine 30.

INDUSTRIAL APPLICABILITY

According to an aspect of the present invention, it is possible to sufficiently cool hot parts even during a load change while reducing the amount of cooling air used when the load is stable.

REFERENCE SIGNS LIST

1 Gas turbine
2 Gas turbine rotor
6 intermediate casing
7 Gas turbine casing
10 Air compressor
12 Compressor rotor
17 Compressor casing
20 Combustor
21 Fuel injector
22 Combustion liner
25 Fuel line
26 Fuel valve
30 Turbine
31 Combustion gas flow passage
32 Turbine rotor
33 Rotor shaft
34 Blade row
35 Blade
37 Turbine casing
38 Vane row
39 Vane
40 Generator
50 Gas turbine cooling system
51 Cooling air line
52 Intake air line
53 Uncooled intake air line
54 Cooled intake air line
55 Discharge line
56 Return line
57 Return valve
61 Booster
62 Motor
63 Inverter
64, 64a Cooler
65a Radiator
66 Coolant valve (cooling amount adjuster)
66a Fan
67a Motor
68a Inverter
68 inlet guide vane (IGV)
68c Variable vane
68b Vane driving device
69 Intake valve (flow rate adjuster)
71 Detector
72 Intake air temperature indicator
73 intake air pressure indicator
74 Discharge temperature indicator 75 Discharge pressure indicator
76 Discharge flowmeter
78 Output meter
100, 100a Control device
101 Reception unit
110, 110a. Flow rate adjuster command generation unit
111 First command generation section
112 Target flow rate generation part
113 Flow rate deviation computation part
114 First operation amount calculation part
121, 121a Second command generation section
122, 122a Second operation amount calculation part
123 Target flow rate generation part
124 Flow rate deviation computation part
128 Command first delay part
129 Command second delay part
130, 130a Coolant valve command generation unit (cooling amount adjuster command generation unit)
131 Third command generation section
132 Target temperature generation part
133 Temperature deviation computation part
134 Third operation amount calculation part
141, 141a Fourth command generation section
142, 142a Fourth operation amount calculation part
143 Target temperature generation part
144 Temperature deviation computation part
148 Command third delay part
149 Command fourth delay part
150 Load change determination unit
151 Command delay section
152 Load deviation computation section
153 Change condition determination section
161 Intake valve command output unit (flow rate adjuster command output unit)
162 Return valve command output unit (flow rate adjuster command output unit)
163 Coolant valve command output unit (cooling amount adjuster command output unit)
170 Host control device

The invention claimed is:

1. A control device of a gas turbine cooling system including:
a cooling air line that guides compressed air compressed by an air compressor of a gas turbine to a hot part coming in contact with combustion gas in the gas turbine;
a cooler that cools the compressed air in the cooling air line to produce cooling air;
a booster that pressurizes the cooling air in the cooling air line; and
a flow rate adjuster that adjusts a flow rate of the cooling air supplied to the hot part through the cooling air line,
wherein the cooling air line has an intake air line that guides compressed air compressed by the air compressor to the booster, a discharge line that guides air pressurized by the booster to the hot part, and a return line that returns air flowing through the discharge line to the intake air line, and,
wherein the flow rate adjuster comprises an intake valve that is provided in the intake air line and a return valve that adjusts a flow rate of the air flowing through the return line;
the control device configured to:
receive a load command indicating a load on the gas turbine;
determine whether the load indicated by the load command has changed;
generate a first command indicating such an operation amount of the flow rate adjuster as allows the flow rate of the cooling air supplied to the hot part to meet a target flow rate that is determined according to an operation state of the gas turbine;
when the load indicated by the load command has changed, generate a second command indicating such an operation amount of the flow rate adjuster as allows a change-adapted flow rate higher than the target flow rate to be met; and
output a flow rate adjuster command based on the second command to the flow rate adjuster when the second command is generated, and output a flow rate adjuster command based on the first command to the flow rate adjuster when the second command is not generated.

2. The control device of a gas turbine cooling system according to claim 1, wherein the change-adapted flow rate is higher than the target flow rate by a predetermined percentage.

3. The control device of a gas turbine cooling system according to claim 1, wherein the control device further generates, as the second command, a command indicating such a feedforward target operation amount of the flow rate adjuster as allows the change-adapted flow rate to be met.

4. The control device of a gas turbine cooling system according to claim 1, wherein the control device further generates, as the second command, a command indicating a feedback operation amount of the flow rate adjuster that is determined so as to reduce a deviation between a target value related to the change-adapted flow rate and a current flow rate of the cooling air.

5. The control device of a gas turbine cooling system according to claim 1, wherein, after the load indicated by the load command has changed, stopping generating the second command when the change in the load indicated by the load command has ended.

6. The control device of a gas turbine cooling system according to claim 1, wherein, after the load indicated by the load command has changed, stopping generating the second command when the change in the load indicated by the load command is determined to have ended and a predetermined second command stop condition is satisfied.

7. The control device of a gas turbine cooling system according to claim 1, wherein the gas turbine cooling system includes a cooling amount adjuster that adjusts an amount of cooling to which the compressed air is subjected by the cooler, and the control device further is configured to:
generate a third command indicating such an operation amount of the cooling amount adjuster as allows a temperature of the cooling air to meet a target temperature;
when the load indicated by the load command has changed, generate a fourth command indicating such an operation amount of the cooling amount adjuster as allows the temperature of the cooling air to meet a change-adapted temperature lower than the target temperature; and
output a cooling amount adjuster command based on the fourth command to the cooling amount adjuster when generating the fourth command, and output a cooling amount adjuster command based on the third command to the cooling amount adjuster when the fourth command is not generated.

8. The control device of a gas turbine cooling system according to claim 7, wherein the change-adapted temperature is lower than the target temperature by a predetermined percentage.

9. The control device of a gas turbine cooling system according to claim 7, wherein the fourth command is a command indicating such a feedforward target operation amount of the cooling amount adjuster as allows the change-adapted temperature to be met.

10. The control device of a gas turbine cooling system according to claim 7, wherein the fourth command is a command indicating a feedback operation amount of the cooling amount adjuster that is determined so as to reduce a deviation between a target value of the change adapted temperature and a current temperature of the cooling air.

11. The control device of a gas turbine cooling system according to claim 7, wherein, after the load indicated by the load command has changed, stopping generating the fourth command when the change in the load indicated by the load command has ended.

12. The control device of a gas turbine cooling system according to claim 7, wherein, after the load indicated by the load command has changed, stopping generating the fourth command when the change in the load indicated by the load command has ended and a predetermined fourth command stop condition is satisfied.

13. A gas turbine facility comprising: the control device of a gas turbine cooling system according to claim 1; and the gas turbine.

14. A control method of a gas turbine cooling system including:
a cooling air line that guides compressed air compressed by an air compressor of a gas turbine to a hot part coming in contact with combustion gas in the gas turbine;
a cooler that cools the compressed air in the cooling air line to produce cooling air;
a booster that pressurizes the cooling air in the cooling air line; and
a flow rate adjuster that adjusts a flow rate of the cooling air supplied to the hot part through the cooling air line,
wherein the cooling air line has an intake air line that guides compressed air compressed by the air compressor to the booster, a discharge line that guides air pressurized by the booster to the hot part, and a return line that returns air flowing through the discharge line to the intake air line, and
wherein the flow rate adjuster comprises an intake valve that is provided in the intake air line and a return valve that adjusts a flow rate of the air flowing through the return line,
the control method comprising:
a reception step of receiving a load command indicating a load on the gas turbine; a load change determination step of determining whether the load indicated by the load command received in the reception step has changed;
a first command generation step of generating a first command indicating such an operation amount of the flow rate adjuster as allows a flow rate of the cooling air supplied to the hot part to meet a target flow rate that is determined according to an operation state of the gas turbine;
a second command generation step of, when it is determined in the load change determination step that the load indicated by the load command has changed, generating a second command indicating such an operation amount of the flow rate adjuster as allows a change-adapted flow rate higher than the target flow rate to be met; and
a command output step of outputting a flow rate adjuster command based on the second command to the flow rate adjuster when the second command is being generated in the second command generation step, and outputting a flow rate adjuster command based on the first command to die flow rate adjuster when the second command is not being generated in the second command generation step.

15. The control method of a gas turbine cooling system according to claim 14, wherein the change-adapted flow rate is higher than the target flow rate by a predetermined percentage.

16. The control method of a gas turbine cooling system according to claim 14, wherein, in the second command generation step, a command indicating such a feedforward target operation amount of the flow rate adjuster as allows the change-adapted flow rate to be met is generated as the second command.

17. The control method of a gas turbine cooling system according to claim 14, wherein, in the second command generation step, a command indicating a feedback operation amount of the flow rate adjuster that is determined so as to reduce a deviation between a target value related to the change-adapted flow rate and a current flow rate of the cooling air is generated as the second command.

18. The control method of a gas turbine cooling system according to claim 14, wherein, after it is determined in the load change determination step that the load indicated by the load command has changed, generation of the second command is stopped in the second command generation step when it is determined that the change in the load indicated by the load command has ended.

19. The control method of a gas turbine cooling system according to claim 14, wherein, after it is determined in the load change determination step that the load indicated by the load command has changed, generation of the second command is stopped in the second command generation step when the change in the load indicated by the load command is determined to have ended and a predetermined second command stop condition is satisfied.

20. The control method of a gas turbine cooling system according to claim 14, wherein
the gas turbine cooling system includes a cooling amount adjuster that adjusts an amount of cooling to which the compressed air is subjected by the cooler, and
the control method further comprises:
a third command generation step of generating a third command indicating such an operation amount of the cooling amount adjuster as allows a temperature of the cooling air to meet a target temperature;
a fourth command generation step of, when it is determined in the load change determination step that the load indicated by the load command has changed, generating a fourth command indicating such an operation amount of the cooling amount adjuster as allows the temperature of the cooling air to meet a change-adapted temperature lower than the target temperature; and
a command output step of outputting a cooling amount adjuster command based on the fourth command to the cooling amount adjuster when the fourth command is being generated in the fourth command generation step, and outputting a cooling amount adjuster command based on the third command to the cooling amount adjuster when the fourth command is not being generated in the fourth command generation step.

21. The control method of a gas turbine cooling system according to claim 20, wherein the change-adapted temperature is lower than the target temperature by a predetermined percentage.

22. The control method of a gas turbine cooling system according to claim 20, wherein, in the fourth command generation step, a command indicating such a feedforward target operation amount of the cooling amount adjuster as allows the change-adapted temperature to be met is generated as the fourth command.

23. The control method of a gas turbine cooling system according to claim 20, wherein, in the fourth command generation step, a command indicating a feedback operation amount of the cooling amount adjuster that is determined so as to reduce a deviation between a target value of the change-adapted temperature and a current temperature of the cooling air is generated as the fourth command.

24. The control method of a gas turbine cooling system according to claim 20, wherein, after it is determined in the load change determination step that the load indicated by the load command has changed, generation of the fourth command is stopped in the fourth command generation step when it is determined in the load change determination step that the change in the load indicated by the load command has ended.

25. The control method of a gas turbine cooling system according to claim 20, wherein, after it is determined in the load change determination step that the load indicated by the load command has changed, generation of the fourth command is stopped in the fourth command generation step when it is determined in the load change determination step that the change in the load indicated by the load command has ended and a predetermined fourth command stop condition is satisfied.

* * * * *